(12) United States Patent
Xi et al.

(10) Patent No.: US 12,536,629 B2
(45) Date of Patent: Jan. 27, 2026

(54) IMAGE PROCESSING METHOD AND ELECTRONIC DEVICE

(71) Applicant: Honor Device Co., Ltd., Shenzhen (CN)

(72) Inventors: Dongmiao Xi, Shenzhen (CN); Tao Shao, Shenzhen (CN); Meng Jin, Shenzhen (CN); Wenhong Zhang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 533 days.

(21) Appl. No.: 17/923,329

(22) PCT Filed: May 9, 2022

(86) PCT No.: PCT/CN2022/091652
§ 371 (c)(1),
(2) Date: Nov. 4, 2022

(87) PCT Pub. No.: WO2023/015989
PCT Pub. Date: Feb. 16, 2023

(65) Prior Publication Data
US 2024/0144451 A1    May 2, 2024

(30) Foreign Application Priority Data
Aug. 10, 2021 (CN) .......................... 202110915914.0

(51) Int. Cl.
*G06T 5/92* (2024.01)
*G06F 3/14* (2006.01)
(Continued)

(52) U.S. Cl.
CPC ................. *G06T 5/92* (2024.01); *G06F 3/14* (2013.01); *G06V 10/56* (2022.01); *G06V 10/60* (2022.01);
(Continued)

(58) Field of Classification Search
CPC ............ G09G 5/06; G09G 2320/0276; G09G 2320/0673; G06V 10/56; G06V 10/60;
(Continued)

(56) References Cited

U.S. PATENT DOCUMENTS 5,565,931 A    10/1996  Girod
7,864,226 B2   1/2011   Asada
(Continued)

FOREIGN PATENT DOCUMENTS

CN    1953503 A    4/2007
CN    104038665 A   9/2014
(Continued)

*Primary Examiner* — Gandhi Thirugnanam
*Assistant Examiner* — Wayne Zhang
(74) *Attorney, Agent, or Firm* — Conley Rose, P.C.

(57) ABSTRACT

An image processing method and an electronic device are disclosed. The image processing method includes: displaying a first screen in a first shooting mode, where the first screen includes a first control; detecting a first operation on the first control; in response to the first operation, determining a first mapping in gamma processing and a second mapping in a two-dimensional lookup table, where the first mapping corresponds to the first control, the second mapping corresponds to the first control, and the first mapping is associated with the second mapping; obtaining a to-be-processed image; and processing the to-be-processed image based on the first mapping and the second mapping to obtain a first image. On the basis of the technical method of this application, computational load of electronic devices during image processing can be effectively reduced.

20 Claims, 40 Drawing Sheets

(51) Int. Cl.
*G06V 10/56* (2022.01)
*G06V 10/60* (2022.01)
*G09G 5/06* (2006.01)

(52) U.S. Cl.
CPC ...... *G09G 5/06* (2013.01); *G06T 2207/10024* (2013.01); *G09G 2320/0673* (2013.01)

(58) Field of Classification Search
CPC .. G06T 11/00; G06T 2207/10024; G06F 3/14
See application file for complete search history.

(56) References Cited

U.S. PATENT DOCUMENTS

| | | | |
|---|---|---|---|
| 8,958,128 | B2 | 2/2015 | Hashizume |
| 9,076,207 | B1 * | 7/2015 | Xue ........................ G06T 5/73 |
| 10,134,360 | B2 | 11/2018 | Bhattacharjee et al. |
| 10,902,766 | B1 * | 1/2021 | Wu ........................ G09G 3/2092 |
| 2007/0247532 | A1 | 10/2007 | Sasaki |
| 2016/0148596 | A1 * | 5/2016 | Bhattacharjee .......... G09G 5/06 345/602 |
| 2017/0104976 | A1 * | 4/2017 | Bishop ................. H04N 13/271 |
| 2021/0097958 | A1 | 4/2021 | Fores Herranz et al. |
| 2024/0212229 | A1 * | 6/2024 | Zhang ................... G06T 11/001 |

FOREIGN PATENT DOCUMENTS

| | | |
|---|---|---|
| CN | 107077828 A | 8/2017 |
| CN | 111476851 A | 7/2020 |
| CN | 111882642 A | 11/2020 |
| CN | 112530382 A | 3/2021 |
| CN | 112634383 A | 4/2021 |
| CN | 113126939 A | 7/2021 |
| WO | 2021052342 A1 | 3/2021 |

* cited by examiner

IMAGE PROCESSING METHOD AND ELECTRONIC DEVICE

CROSS-REFERENCE TO RELATED APPLICATIONS

This application is a U.S. National Stage of International Application No. PCT/CN2022/091652 filed on May 9, 2022, which claims priority to Chinese Patent Application No. 202110915914.0, filed with China National Intellectual Property Administration on Aug. 10, 2021, both of which are incorporated herein by reference in their entireties.

TECHNICAL FIELD

This application relate to the field of image processing technologies, and in particular, to an image processing method and an electronic device.

BACKGROUND

A three-dimensional lookup table (Three Dimension Look Up Table, 3D LUT) is widely used in the field of image processing. Usually, color correction or image style adjustment on images is implemented by loading a 3D LUT on an electronic device, to achieve different image effects.

To implement the 3D LUT function in the electronic device, it is necessary to load a color lookup table and perform calculation of three-dimensional interpolation. The color lookup table is a three-dimensional mapping table between discrete original color data and corrected color data. However, implementation of the 3D LUT function imposes relatively high requirements on a storage size and computing capability of the electronic device. In a case with a limited storage size or with constraints on performance and power consumption, the electronic devices cannot meet the requirements for using the 3D LUT Therefore, in a case that the electronic device is subject to performance constraints, how to process images to implement color correction or image style adjustment of the images becomes an urgent problem to be resolved.

SUMMARY

This application provides an image processing method and an electronic device, so as to process to-be-processed images by using a second mapping in a two-dimensional lookup table and a first mapping in gamma processing, thereby effectively reducing computational load of electronic devices.

According to a first aspect, an image processing method is provided, including:

displaying a first screen in a first shooting mode, where the first screen includes a first control; detecting a first operation on the first control; in response to the first operation, determining a first mapping in gamma processing and a second mapping in a two-dimensional lookup table, where the first mapping corresponds to the first control, the second mapping corresponds to the first control, and the first mapping is associated with the second mapping; obtaining a to-be-processed image; and processing the to-be-processed image based on the first mapping and the second mapping to obtain a first image.

It should be understood that the second mapping in the two-dimensional lookup table may be a functional relationship, and color information of each pixel may be relocated by using the second mapping to obtain new color information. An image pattern can be determined by using the second mapping in the two-dimensional lookup table, and different filtering effects can be implemented in a camera in this image pattern.

In this embodiment of this application, the electronic device may determine the first mapping in the gamma processing and the second mapping in the two-dimensional lookup table in response to the detected first operation; and processes the to-be-processed image based on the first mapping and the second mapping to obtain the first image. Because the second mapping in the two-dimensional lookup table and the first mapping in the gamma processing are used to process the to-be-processed image in this embodiment of the present invention, and the first mapping is associated with the second mapping, compared with processing of to-be-processed images by using a three-dimensional lookup table, the image processing method in this application can effectively reduce computational load of the electronic device.

With reference to the first aspect, in some implementations of the first aspect, the first shooting mode is a shooting mode in which a frame output rate of images is greater than a preset threshold.

In a possible implementation, the first shooting mode may be a shooting mode with a higher frame output rate; for example, may be a slow motion shooting mode in a camera application.

With reference to the first aspect, in some implementations of the first aspect, the first control is a control for indicating the second mapping in the two-dimensional lookup table.

In a possible implementation, the first screen may be a shooting preview screen, the shooting preview screen includes an image pattern preview frame, and the image pattern preview frame may include a plurality of different image patterns, where the image pattern may refer to a filter effect of an image. The detected first operation on the first control may be an operation of selecting a target style in the image pattern preview frame by a user. One image pattern may correspond to one mapping of the two-dimensional lookup table, that is, one image pattern may correspond to one target two-dimensional lookup table.

With reference to the first aspect, in some implementations of the first aspect, the first control is a control for indicating automatic identification of the second mapping in the two-dimensional lookup table.

In a possible implementation, the first screen may be a setting screen of the camera application, and the first operation may be an operation of enabling automatic image-pattern recognition by the user on the setting screen. After the automatic image-pattern recognition function is enabled, the camera can automatically identify and determine the target style based on a shooting scene, that is, the second mapping in the two-dimensional lookup table can be automatically determined based on the shooting scene.

With reference to the first aspect, in some implementations of the first aspect, the processing the to-be-processed image based on the first mapping and the second mapping to obtain a first image includes: processing the to-be-processed image based on the first mapping to obtain a second image; determining a first adjustment amount and a second adjustment amount based on the second image and the second mapping, where the first adjustment amount is used to indicate an adjustment amount of a first color component in the second image, and the second adjustment amount is used to indicate an adjustment amount of a second color component in the second image; and obtaining the first image based on the second image, the first adjustment amount, and the second adjustment amount.

With reference to the first aspect, in some implementations of the first aspect, the first mapping being associated with the second mapping is used to indicate that the second mapping in the two-dimensional lookup table is determined based on the first mapping in the gamma processing.

In this embodiment of this application, the first mapping in the gamma processing is associated with the second mapping in the two-dimensional lookup table, that is, the second mapping in the two-dimensional lookup table is determined based on the first mapping in the gamma processing.

With reference to the first aspect, in some implementations of the first aspect, the second mapping in the two-dimensional lookup table being determined based on the first mapping in the gamma processing includes:

obtaining a third mapping in the gamma processing and a fourth mapping in a three-dimensional lookup table, where the fourth mapping in the three-dimensional lookup table corresponds to the second mapping in the two-dimensional lookup table;

evenly dividing a first color space to obtain an image in an initial first color space and an image in an initial second color space;

processing the image in the initial second color space based on the first mapping of the gamma processing, the third mapping of the gamma processing, and the fourth mapping in the three-dimensional lookup table, to obtain a third image, where the third image is an image in the second color space;

converting the third image to a fourth image in the first color space; and determining the second mapping in the two-dimensional lookup table based on a pixel difference between the image in the initial first color space and the fourth image in the first color space.

With reference to the first aspect, in some implementations of the first aspect, the determining the second mapping in the two-dimensional lookup table based on a pixel difference between the image in the initial first color space and the fourth image in the first color space includes:

determining a first lightness value; and when lightness is the first lightness value, determining the second mapping in the two-dimensional lookup table based on the pixel difference between the image in the initial first color space and the fourth image in the first color space.

It should be understood that an excessively large or small lightness value may introduce much image noise into the image. Therefore, it is necessary to avoid an excessively large or small lightness value during determining of the first lightness value.

With reference to the first aspect, in some implementations of the first aspect, the first color space is an HSL color space or an HSV color space, and the second color space is an RGB color space.

According to a second aspect, an electronic device is provided. The electronic device includes: one or more processors, a memory, and a display; where the memory is coupled to the one or more processors, the memory is configured to store computer program code; the computer program code includes a computer instruction; and the one or more processors invoke the computer instruction to cause the electronic device to perform the following steps: displaying a first screen in a first shooting mode, where the first screen includes a first control; detecting a first operation on the first control, in response to the first operation, determining a first mapping in gamma processing and a second mapping in a two-dimensional lookup table, where the first mapping corresponds to the first control, the second mapping corresponds to the first control, and the first mapping is associated with the second mapping; obtaining a to-be-processed image; and processing the to-be-processed image based on the first mapping and the second mapping to obtain a first image.

With reference to the second aspect, in some implementations of the second aspect, the one or more processors invoke the computer instruction to cause the electronic device to perform the following steps:

processing the to-be-processed image based on the first mapping to obtain a second image;

determining a first adjustment amount and a second adjustment amount based on the second image and the second mapping, where the first adjustment amount is used to indicate an adjustment amount of a first color component in the second image, and the second adjustment amount is used to indicate an adjustment amount of a second color component in the second image; and obtaining the first image based on the second image, the first adjustment amount, and the second adjustment amount.

With reference to the second aspect, in some implementations of the second aspect, the first mapping being associated with the second mapping is used to indicate that the second mapping in the two-dimensional lookup table is determined based on the first mapping in the gamma processing.

With reference to the second aspect, in some implementations of the second aspect, the one or more processors invoke the computer instruction to cause the electronic device to perform the following steps:

obtaining a third mapping in the gamma processing and a fourth mapping in a three-dimensional lookup table, where the fourth mapping in the three-dimensional lookup table corresponds to the second mapping in the two-dimensional lookup table;

evenly dividing a first color space to obtain an image in an initial first color space and an image in an initial second color space;

processing the image in the initial second color space based on the first mapping of the gamma processing, the third mapping of the gamma processing, and the fourth mapping in the three-dimensional lookup table, to obtain a third image, where the third image is an image in the second color space;

converting the third image to a fourth image in the first color space; and determining the second mapping in the two-dimensional lookup table based on a pixel difference between the image in the initial first color space and the fourth image in the first color space.

With reference to the second aspect, in some implementations of the second aspect, the one or more processors invoke the computer instruction to cause the electronic device to perform the following steps:

determining a first lightness value; and when lightness is the first lightness value, determining the second mapping in the two-dimensional lookup table based on the pixel difference between the image in the initial first color space and the fourth image in the first color space.

With reference to the second aspect, in some implementations of the second aspect, the first color space is an HSL color space or an HSV color space, and the second color space is an RGB color space.

With reference to the second aspect, in some implementations of the second aspect, the first shooting mode is a shooting mode in which a frame output rate of images is greater than a preset threshold.

With reference to the second aspect, in some implementations of the second aspect, the first control is a control for indicating the second mapping in the two-dimensional lookup table.

With reference to the second aspect, in some implementations of the second aspect, the first control is a control for indicating automatic identification of the second mapping in the two-dimensional lookup table.

It should be understood that expansion, limitation, interpretation, and description on related content in the first aspect are also applied to the same content in the second aspect.

According to a third aspect, an electronic device is provided. The electronic device includes one or more processors, a memory, and a display, where the memory is coupled to the one or more processors, the memory is configured to store computer program code, the computer program code includes a computer instruction, and the one or more processors invoke the computer instruction to cause the electronic device to perform any image processing method in the first aspect.

According to a fourth aspect, a chip system is provided, where the chip system is applied to an electronic device, the chip system includes one or more processors, and the processor invokes a computer instruction to cause the electronic device to perform any image processing method in the first aspect.

According to a fifth aspect, a computer-readable storage medium is provided. The computer-readable storage medium stores computer program code, and when the computer program code is executed by an electronic device, the electronic device is caused to perform any image processing method in the first aspect.

According to a sixth aspect, a computer program product is provided. The computer program product includes computer program code, and when the computer program code is executed by an electronic device, the electronic device is caused to perform any image processing method in the first aspect.

In the embodiments of this application, the electronic device may determine the first mapping in the gamma processing and the second mapping in the two-dimensional lookup table in response to the detected first operation; and processes the to-be-processed image based on the first mapping and the second mapping to obtain the first image. Because the second mapping in the two-dimensional lookup table and the first mapping in the gamma processing are used to process the to-be-processed image in the embodiments of the present invention, and the first mapping is associated with the second mapping, compared with processing of to-be-processed images by using a three-dimensional lookup table, the image processing method in this application can effectively reduce computational load of the electronic device.

DESCRIPTION OF EMBODIMENTS

The following describes the technical solutions of the embodiments in this application with reference to accompanying drawings.

Figure 1:
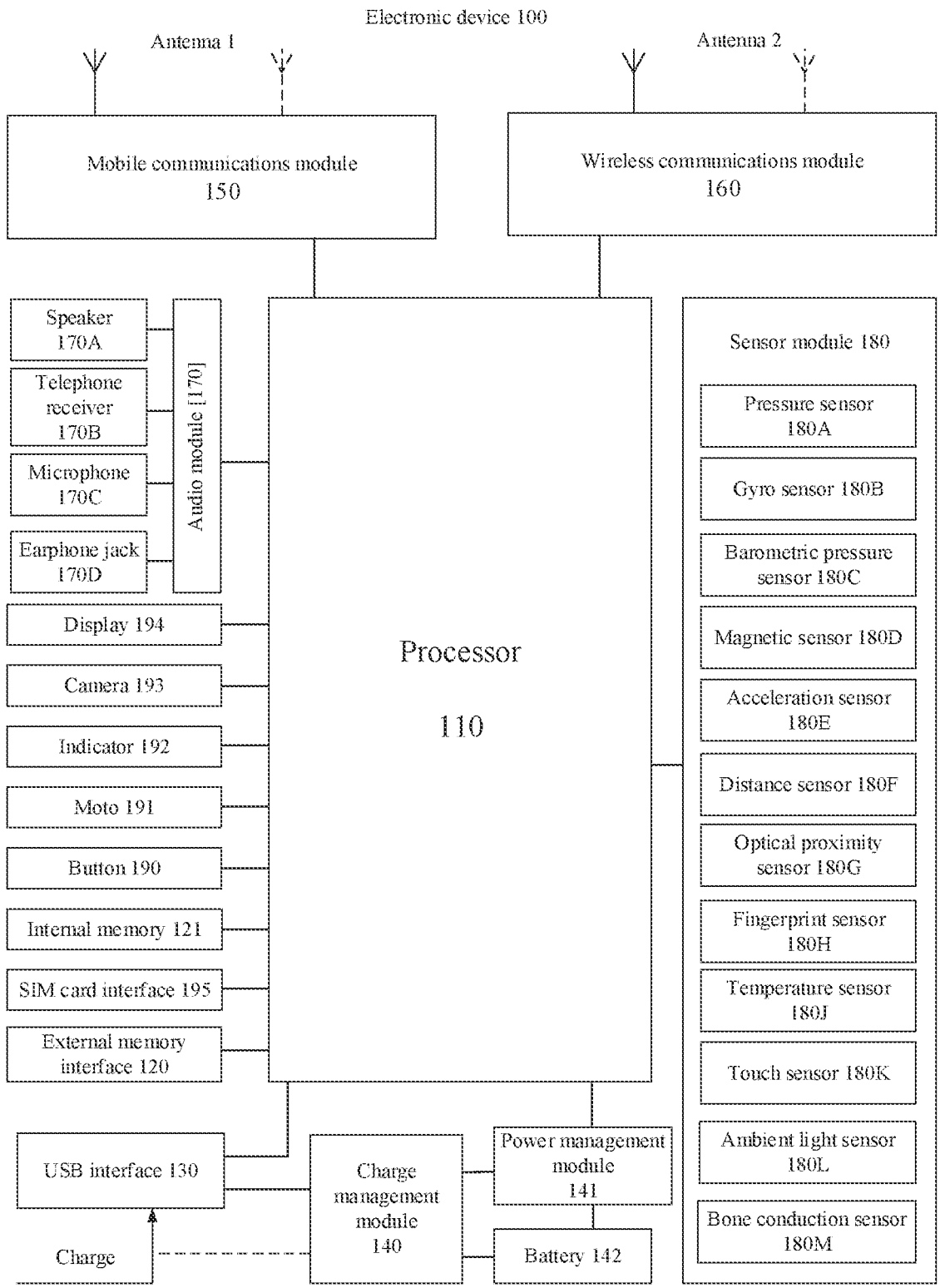
FIG. 1 is a schematic diagram of a hardware system of an apparatus to which this application is applicable.

FIG. 1 shows a hardware system of an electronic device to which this application is applicable.

The electronic device 100 may be a mobile phone, a smart screen, a tablet computer, a wearable electronic device, an in-vehicle electronic device, an augmented reality (augmented reality, AR) device, a virtual reality (virtual reality, VR) device, a notebook computer, an ultra-mobile personal computer (ultra-mobile personal computer, UMPC), a netbook, a personal digital assistant (personal digital assistant, PDA), a projector, or the like. The embodiments of this application impose no limitation on a specific type of the electronic device 100.

The electronic device 100 may include a processor 110, an external memory interface 120, an internal memory 121, a universal serial bus (universal serial bus, USB) interface 130, a charge management module 140, a power management module 141, a battery 142, an antenna 1, an antenna 2, a mobile communications module 150, a wireless communications module 160, an audio module 170, a speaker 170A, a telephone receiver 170B, a microphone 170C, an earphone jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It should be noted that the structure shown in FIG. 1 does not constitute any specific limitation on the electronic device 100. In some other embodiments of this application, the electronic device 100 may include more or fewer components than those shown in FIG. 1, or the electronic device 100 may include a combination of some of the components shown in FIG. 1, or the electronic device 100 may include sub-components of some of the components shown in FIG. 1. The components shown in FIG. 1 may be implemented by hardware, software, or a combination of software and hardware.

The processor 110 may include one or more processing units. For example, the processor 110 may include at least one of the following processing units, an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and a neural-network processing unit (neural-network processing unit, NPU). Different processing units may be independent components or an integrated component.

The controller may generate an operation control signal according to an instruction operation code and a timing signal, to complete control of instruction fetching and execution.

A memory may be further provided in the processor 110 for storing instructions and data. In some embodiments, the memory in the processor 110 is a cache. The memory may store instructions or data that the processor 110 has just used or used repeatedly. If the processor 110 needs to use the instruction or data again, the processor 110 may directly invoke the instruction or data from the memory. This avoids repeated access and reduces a waiting time of the processor 110, thereby improving system efficiency.

In some embodiments, the processor 110 may include one or more interfaces. For example, the processor 110 may include at least one of the following interfaces; an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a SIM interface, and a USB interface.

The I2C interface is a bidirectional synchronous serial bus and includes a serial data line (serial data line, SDA) and a serial clock line (serail clock line, SCL). In some embodiments, the processor 110 may include a plurality of groups of I2C buses. The processor 110 may be coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface to implement a touch function of the electronic device 100.

The I2S interface may be configured to perform audio communication. In some embodiments, the processor 110 may include a plurality of groups of I2S buses. The processor 110 may be coupled to the audio module 170 through an I2S bus to implement communication between the processor 110 and the audio module 170. In some embodiments, the audio module 170 may transfer an audio signal to the wireless communications module 160 through the I2S interface, so as to implement a function of answering calls through a Bluetooth earphone.

The PCM interface may be also configured to perform audio communication to sample, quantize, and encode an analog signal. In some embodiments, the audio module 170 may be coupled to the wireless communications module 160 through a PCM interface. In some embodiments, the audio module 170 may also transfer an audio signal to the wireless communications module 160 through the PCM interface, so as to implement a function of answering calls through a Bluetooth earphone. Both the I2S interface and the PCM interface may be configured to perform audio communication.

The UART interface is a universal serial data bus and is configured to perform asynchronous communication. The bus may be a bidirectional communications bus that converts to-be-transmitted data between serial communication and parallel communication. In some embodiments, the UART interface is generally configured to connect the processor 110 to the wireless communications module 160. For example, the processor 110 communicates with a Bluetooth module of the wireless communications module 160 through the UART interface, to implement a Bluetooth function. In some embodiments, the audio module 170 may transfer an audio signal to the wireless communications module 160 through the UART interface, so as to implement a function of playing music by using a Bluetooth earphone.

The MIPI interface may be configured to connect the processor 110 to a peripheral device such as the display 194 and the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a shooting function of the electronic device 100. The processor 110 communicates with the display 194 through a DSI interface, to implement a display function of the electronic device 100.

The GPIO interface may be configured by using software. The GPIO interface may be configured as a control signal interface or a data signal interface. In some embodiments, the GPIO interface may be configured to connect the processor 110 to the camera 193, the display 194, the wireless communications module 160, the audio module 170, and the sensor module 180. The GPIO interface may alternatively be configured as an I2C interface, an I2S interface, a UART interface, or an MIPI interface.

The USB interface 130 is an interface that complies with the USB standard specification. For example, the USB interface 130 may be a mini (Mini) USB interface, a micro (Micro) USB interface, or a USB type-C (USB Type C) interface. The USB interface 130 may be configured to connect a charger to charge the electronic device 100, may be also configured to transmit data between the electronic device 100 and a peripheral device, and may be also configured to connect to an earphone to play audio by using the earphone. The USB interface 130 may be further configured to connect to another electronic device 100, for example, an AR device.

A connection relationship between the modules shown in FIG. 1 is merely used as an example for description, and does not constitute any limitation on the connection relationship between the modules of the electronic device 100. Optionally, the modules of the electronic device 100 may alternatively use a combination of a plurality of connection manners in the foregoing embodiments.

The charge management module 140 is configured to receive electricity from a charger. The charger may be a wireless charger, or may be a wired charger. In some embodiments of wired charging, the charge management module 140 may receive current from the wired charger through the USB interface 130. In some embodiments of wireless charging, the charge management module 140 may receive electromagnetic waves (a current path is shown by a dashed line) through a wireless charging coil of the electronic device 100. The charge management module 140 may also supply power to the electronic device 100 through the power management module 141 while charging the battery 142.

The power management module 141 is configured to connect to the battery 142, the charge management module 140, and the processor 110. The power management module 141 receives an input from the battery 142 and/or the charge management module 140, and supplies power to the processor 110, the internal memory 121, the display 194, the camera 193, the wireless communications module 160, and the like. The power management module 141 may be further configured to monitor parameters such as battery capacity, battery cycle count, and battery state of health (electric leakage or impedance). Optionally, the power management module 141 may be provided in the processor 110, or the power management module 141 and the charge management module 140 may be provided in a same component.

A wireless communication function of the electronic device 100 may be implemented by using components such as the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication bands. In addition, different antennas may be multiplexed to improve utilization of the antennas. For example, the antenna 1 may multiplex a diversity antenna used in a wireless local area network. In some other embodiments, the antenna may be used in combination with a tuning switch.

The mobile communications module 150 may provide a wireless communication solution applied to the electronic device 100, for example, at least one of the following solutions: a $2^{nd}$ generation ($2^{th}$ generation, 2G) mobile communication solution, a $3^{rd}$ generation ($3^{th}$ generation, 3G) mobile communication solution, a $4^{th}$ generation ($4^{th}$ generation, 4G) mobile communication solution, and a $5^{th}$ generation ($5^{th}$ generation, 5G) mobile communication solution. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit the processed electromagnetic wave to a modem processor for demodulation. The mobile communications module 150 may further amplify a signal obtained through modulation by the modem processor, and convert the amplified signal into an electromagnetic wave and radiate the electromagnetic wave through the antenna 1. In some embodiments, at least some functional modules of the mobile communications module 150 may be provided in the processor 110. In some embodiments, at least some functional modules of the mobile communications module 150 may be provided in a same component as at least some modules of the processor 110.

The modem processor may include a modulator and a demodulator. The modulator is configured to modulate a to-be-transmitted low-frequency baseband signal into a medium-high-frequency signal. The demodulator is configured to demodulate a received electromagnetic wave signal into a low frequency baseband signal. Then, the demodulator sends the low frequency baseband signal obtained through demodulation to the baseband processor for processing. After being processed by the baseband processor, the low frequency baseband signal is sent to the application processor. The application processor outputs a sound signal by using an audio device (for example, the speaker 170A or the telephone receiver 170B), or displays an image or a video by using the display 194. In some embodiments, the modem processor may be an independent component. In some other embodiments, the modem processor may be independent from the processor 110 and provided in a same component as the mobile communications module 150 or another function module.

Similar to the mobile communications module 150, the wireless communications module 160 may also provide wireless communications solutions that are applied to the electronic device 100, for example, at least one of the following solutions: a wireless local area network (wireless local area network, WLAN), Bluetooth (Bluetooth, BT), Bluetooth low energy (Bluetooth low energy, BLE), ultra wide band (ultra wide band, UWB), a global navigation satellite system (global navigation satellite system, GNSS), frequency modulation (frequency modulation, FM), near field communication (near field communication, NFC), and an infrared (infrared. IR) technology. The wireless communications module 160 may be one or more components integrating at least one communication processing module. The wireless communications module 160 receives an electromagnetic wave through the antenna 2, performs frequency modulation and filtering processing on an electromagnetic wave signal, and transmits a processed signal to the processor 110. The wireless communications module 160 may also receive a to-be-transmitted signal from the processor 110, perform frequency modulation and amplification on the signal, and convert the signal into an electromagnetic wave and radiate the electromagnetic wave through the antenna 2.

In some embodiments, the antenna 1 of the electronic device 100 is coupled to the mobile communications module 150, and the antenna 2 of the electronic device 100 is coupled to the wireless communications module 160, so that the electronic device 100 can communicate with a network and other electronic devices by using a wireless communication technology. The wireless communication technology may include at least one of the following communications technologies; global system for mobile communications (global system for mobile communications, GSM), general packet radio service (general packet radio service, GPRS), code division multiple access (code division multiple access, CDMA), wideband code division multiple access (wideband code division multiple access. WCDMA), time-division code division multiple access (time-division code division multiple access, TD-SCDMA), long term evolution (long term evolution, LTE), BT, GNSS, WLAN, NFC, FM, and IR technology. The GNSS may include at least one of the following positioning technologies: the global positioning system (global positioning system, GPS), the global navigation satellite system (global navigation satellite system, GLONASS), the BeiDou navigation satellite system (beidou navigation satellite system, BDS), the quasi-zenith satellite system (quasi-zenith satellite system, QZSS), and satellite based augmentation systems (satellite based augmentation systems, SBAS).

The electronic device 100 may implement a display function by using the GPU, the display 194, the application processor, and the like. The GPU is a microprocessor for image processing, and is connected to the display 194 and the application processor. The GPU is configured to perform mathematical and geometric computing for graphics rendering. The processor 110 may include one or more GPUs that execute program instructions to generate or change display information.

The display 194 may be configured to display images or videos. The display 194 includes a display panel. The display panel may use a liquid crystal display (liquid crystal display, LCD), an organic light-emitting diode (organic light-emitting diode, OLED), an active-matrix organic light emitting diode (active-matrix organic light emitting diode. AMOLED), a flex light-emitting diode (flex light-emitting diode, FLED), a mini light-emitting diode (mini light-emitting diode, mini LED), a micro light-emitting diode (micro light-emitting diode. Micro LED), a micro OLED (Micro OLED), or a quantum dot light emitting diode (quantum dot light emitting diodes, QLED). In some embodiments, the electronic device 100 may include one or N displays 194, where N is a positive integer greater than 1.

The electronic device 100 may implement a shooting function by using the ISP, the camera 193, the video codec, the GPU, the display 194, the application processor, and the like.

The ISP is configured to process data fed back by the camera 193. For example, during photographing, a shutter is opened, allowing light to be transferred to a photosensitive element of the camera through a lens. An optical signal is converted into an electrical signal. The photosensitive element of the camera transfers the electrical signal to the ISP for processing, and the ISP converts the electrical signal into an image visible to naked eyes. The ISP may optimize noise, brightness, and a color of the image based on algorithms.

The ISP may further optimize parameters such as exposure and color temperature of a shooting scene. In some embodiments, the ISP may be disposed in the camera 193.

The camera 193 is configured to capture a static image or a video. An optical image is generated for an object by using the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal to an electrical signal, and then transfers the electrical signal to the ISP. The ISP converts the electrical signal into a digital image signal. The ISP outputs the digital image signal to the DSP for processing. The DSP converts the digital image signal into an image signal in a standard format such as red green blue (red green blue, RGB) or YUV. In some embodiments, the electronic device 100 may include one or N cameras 193, where N is a positive integer greater than 1.

The digital signal processor is configured to process a digital signal. In addition to a digital image signal, the digital signal processor may process another digital signal. For example, when the electronic device 100 selects a frequency, the digital signal processor is configured to perform Fourier transform and the like on energy of the frequency.

The video codec is configured to compress or decompress a digital video. The electronic device 100 may support one or more types of video codecs, so that the electronic device 100 can play or record videos in a plurality of encoding formats, for example, the moving picture experts group (moving picture experts group, MPEG)1, MPEG2, MPEG3, and MPEG4.

The NPU is a processor that emulates a biological neural network structure, may quickly process input information, for example, by emulating a mode of transfer between human-brain neurons, and may further perform self-learning constantly. With the NPU, the electronic device 100 can implement intelligent cognition and other functions such as image recognition, face recognition, voice recognition, and text understanding.

The external memory interface 120 may be configured to connect an external memory card, for example, a secure digital (secure digital, SD) card, to expand a storage capacity of the electronic device 100. The external memory card communicates with the processor 110 through the external memory interface 120, to implement a data storage function, for example, storing a music file, a video file, or the like in the external storage card The internal memory 121 may be configured to store computer executable program code, where the executable program code includes instructions. The internal memory 121 may include a program storage area and a data storage area. The program storage area may store an operating system and an application program required by at least one function (for example, a sound play function or an image play function). The data storage area may store data (for example, audio data or a phone book) and the like that are created during use of the electronic device 100. In addition, the internal memory 121 may include a high-speed random access memory, and may further include a nonvolatile memory, for example, at least one magnetic disk storage device, flash memory device, or universal flash storage (universal flash storage, UFS). By running the instructions stored in the internal memory 121 and/or the instructions stored in the memory that is provided in the processor, the processor 110 executes various processing methods of the electronic device 100.

The electronic device 100 may implement an audio function, for example, music playing or sound recording, by using the audio module 170, the speaker 170A, the telephone receiver 170B, the microphone 170C, the earphone jack 170D, the application processor, and the like.

The audio module 170 is configured to convert digital audio information into an analog audio signal for output, and may be also configured to convert an analog audio input into a digital audio signal. The audio module 170 may be further configured to encode and decode audio signals. In some embodiments, the audio module 170 or some functional modules of the audio module 170 may be provided in the processor 110.

The speaker 170A, also referred to as a loudspeaker, is configured to convert an audio electrical signal into a sound signal. The electronic device 100 may be used for listening to music or answering a hands-free call by using the speaker 170A.

The telephone receiver 170B, also referred to as an earpiece, is configured to convert an audio electrical signal into a sound signal. When using the electronic device 100 to answer a call or receive a voice message, a user can hear a voice by putting the telephone receiver 170B close to an ear.

The microphone 170C, also referred to as mic or mike, is configured to convert a sound signal into an electrical signal. When making a call or sending a voice message, a user may input a sound signal into the microphone 170C by speaking close to the microphone 170C. At least one microphone 170C may be provided in the electronic device 100. In some other embodiments, the electronic device 100 may be provided with two microphones 170C, implement a noise reduction function. In some other embodiments, the electronic device 100 may alternatively be provided with three, four, or more microphones 170C to implement functions of sound source identification, directional recording, and the like. The processor 110 may process an electrical signal output by the microphone 170C. For example, the audio module 170 and the wireless communications module 160 may be coupled through a PCM interface. After converting an ambient sound into an electrical signal (for example, a PCM signal), the microphone 170C transmits the electrical signal to the processor 110 through the PCM interface. The processor 110 performs volume analysis and frequency analysis on the electrical signal to determine volume and frequency of the ambient sound.

The earphone jack 170D is configured to connect to a wired earphone. The earphone jack 170D may be the USB interface 130, or may be a 3.5 mm open mobile terminal platform (open mobile terminal platform, OMTP) standard interface, or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There are various types of pressure sensors 180A, for example, resistive pressure sensor, inductive pressure sensor, and capacitive pressure sensor. The capacitive pressure sensor may include at least two parallel plates made of a conducting material. When force is applied to the pressure sensor 180A, a capacitance between electrodes changes. The electronic device 100 determines pressure intensity based on a change of the capacitance. When a touch operation is performed on the display 194, the electronic device 100 detects the touch operation by using the pressure sensor 180A. The electronic device 100 may also obtain a touch position through calculation based on a signal detected by the pressure sensor 180A. In some embodiments, touch operations that are performed in a same touch position but have different touch operation strength may be corresponding to different operation instructions. For example, when a touch operation with a touch operation strength being less than a first pressure threshold is performed on an SMS message application icon, an instruction for viewing an SMS message is executed. When a touch operation with a touch operation strength being greater than or equal to the first pressure threshold is performed on the SMS message application icon, an instruction for creating a new SMS message is executed.

The gyro sensor 180B may be configured to determine a motion posture of the electronic device 100. In some embodiments, an angular velocity of the electronic device 100 around three axes (namely, x, y, and z axes) may be determined by using the gyro sensor 180B. The gyro sensor 180B may be used for image stabilization during shooting. For example, when a shutter is pressed, the gyro sensor 180B detects a shaking angle of the electronic device 100, and calculates, based on the angle, a distance that a lens module needs to be compensated for, so that the lens can move reversely to counteract the shaking of the terminal device 100, so as to implement image stabilization. The gyro sensor 180B may be also used in a navigation scenario, a somatic game scenario, and the like.

The barometric pressure sensor 180C is configured to measure barometric pressure. In some embodiments, the electronic device 100 calculates an altitude based on a barometric pressure value measured by the barometric pressure sensor 180C to assist in positioning and navigation.

The magnetic sensor 180D includes a Hall effect sensor. The electronic device 100 may detect opening and closing of a flip cover or smart cover by using the magnetic sensor 180D. In some embodiments, when the electronic device 100 is a clamshell phone, the electronic device 100 may detect opening and closing of a flip cover by using the magnetic sensor 180D. The electronic device 100 may set, based on a detected open/closed state of a leather case or a detected open/closed state of the flip cover, a feature that automatic unlocking is implemented when the clamshell phone is flipped open, or the like.

The acceleration sensor 180E may detect magnitudes of accelerations of the electronic device 100 in various directions (generally along x, y, and z axes), may detect a magnitude and direction of gravity when the electronic device 100 is still, The acceleration sensor 180E may be further configured to identify a posture of the electronic device 100 as an input parameter of an application such as landscape/portrait mode switching or a pedometer.

The distance sensor 180F is configured to measure a distance. The electronic device 100 may measure a distance in an infrared or a laser manner. In some embodiments, for example, in a shooting scene, the electronic device 100 may use the distance sensor 180F to measure a distance for rapid focusing.

The optical proximity sensor 180G may include, for example, a light emitting diode (light-emitting diode, LED) and a light detector, for example, a photodiode. The LED may be an infrared LED. The electronic device 100 emits infrared light to the outside by using the LED, and the electronic device 100 uses a photodiode to detect infrared light reflected from a nearby object. When reflected light is detected, the electronic device 100 may determine that there is an object near the electronic device 100. When no reflected light is detected, the electronic device 100 may determine that there is no object near the electronic device 100. The electronic device 100 may detect, by using the optical proximity sensor 180G, whether a user is holding the electronic device 100 close to an ear for making a call, so as to automatically turn off the screen to save power. The optical proximity sensor 180G may be also used for automatic screen unlocking or locking in leather case mode or pocket mode.

The ambient light sensor 180L is configured to sense brightness of ambient light. The electronic device 100 may adaptively adjust brightness of the display 194 based on the sensed brightness of the ambient light. The ambient light sensor 180L may be further configured to automatically adjust white balance during shooting. The ambient light sensor 180L may also cooperate with the optical proximity sensor 180G to detect whether the electronic device 100 is in a pocket to avoid accidental touch.

The fingerprint sensor 180H is configured to collect fingerprints. The electronic device 100 can implement functions such as unlocking, application lock access, shooting, and call answering by using collected fingerprint characteristics.

The temperature sensor 180J is configured to perform temperature detection. In some embodiments, the electronic device 100 executes a temperature processing policy by using a temperature detected by the temperature sensor 180J. For example, when a temperature reported by the temperature sensor 180J exceeds a threshold, the electronic device 100 degrades performance of a processor near the temperature sensor 180J, to reduce power consumption and implement thermal protection. In some other embodiments, when a temperature is less than another threshold, the electronic device 100 heats the battery 142 to avoid abnormal shutdown of the electronic device 100 caused by low temperature. In some other embodiments, when a temperature is less than still another threshold, the electronic device 100 boosts an output voltage of the battery 142 to avoid abnormal shutdown caused by low temperature.

The touch sensor 180K is also referred to as a touch component. The touch sensor 180K may be disposed on the display 194, and the touch sensor 180K and the display 194 form a touchscreen, also referred to as touch control screen. The touch sensor 180K is configured to detect a touch operation performed on or near the touch sensor 180K. The touch sensor 180K may transfer the detected touch operation to the application processor for determining a touch event type, and may provide a visual output related to the touch operation by using the display 194. In some other embodiments, the touch sensor 180K may alternatively be disposed on a surface of the electronic device 100 at a different location than the display 194.

The bone conduction sensor 180M may obtain a vibration signal. In some embodiments, the bone conduction sensor 180M may obtain a vibration signal generated when a human voice vibrates a bone. The bone conduction sensor 180M may also sense human pulses to receive a blood pressure pulse signal. In some embodiments, the bone conduction sensor 180M may alternatively be provided in an earphone to form a bone conduction earphone. The audio module 170 may parse out a voice signal from the vibration signal obtained by the bone conduction sensor 180M when the human voice vibrates the bone, to implement a voice function. The application processor may parse out heart rate information from the blood pressure pulse signal obtained by the bone conduction sensor 180M, to implement a heart rate detection function.

The button 190 includes a power on/off button, a volume button, and the like. The button 190 may be a mechanical button or a touch button. The electronic device 100 may receive a button-based input signal to implement a function related to the button-based input signal.

The motor 191 may generate vibration. The motor 191 may be configured to provide an incoming call alert and a touch feedback. The motor 191 may generate different vibration feedback effects for touch operations performed on different applications. The motor 191 may also generate different vibration feedback effects for touch operations performed in different areas of the display 194. Different application scenarios (for example, time reminder, message reception, alarm clock, and gaming) may be also corresponding to different vibration feedback effects. In addition, touch vibration feedback effects may be user-defined.

The indicator 192 may be an indicator lamp, may be configured to indicate a charging status and a battery level change, and may be also configured to indicate a message, a missed call, and a notification.

The SIM card interface 195 is configured to connect to a SIM card. The SIM card may be inserted into the SIM card interface 195 to come into contact with the electronic device 100, or removed from the SIM card interface 195 to separate from the electronic device 10X). The electronic device 100 may support one or N SIM card interfaces, where N is a positive integer greater than 1. A plurality of cards may be inserted into one SIM card interface 195 at the same time, and the plurality of cards may be of a same type or of different types. The SIM card interface 195 may be also compatible with an external storage card. The electronic device 100 interacts with a network by using a SIM card, to implement a call function, a data communication function, and the like. In some embodiments, the electronic device 100 uses an embedded SIM (embedded-SIM, eSIM) card, and the eSIM card may be embedded in the electronic device 100 and cannot be separated from the electronic device 100.

A hardware system of the electronic device 100 is described in detail above, and a software system of the electronic device 100 is described below. The software system may use a layered architecture, an event-driven architecture, a microkemel architecture, a microservice architecture, or a cloud architecture. The embodiments of this application use the layered architecture as an example to exemplarily describe the software system of the electronic device 100.

Figure 2:
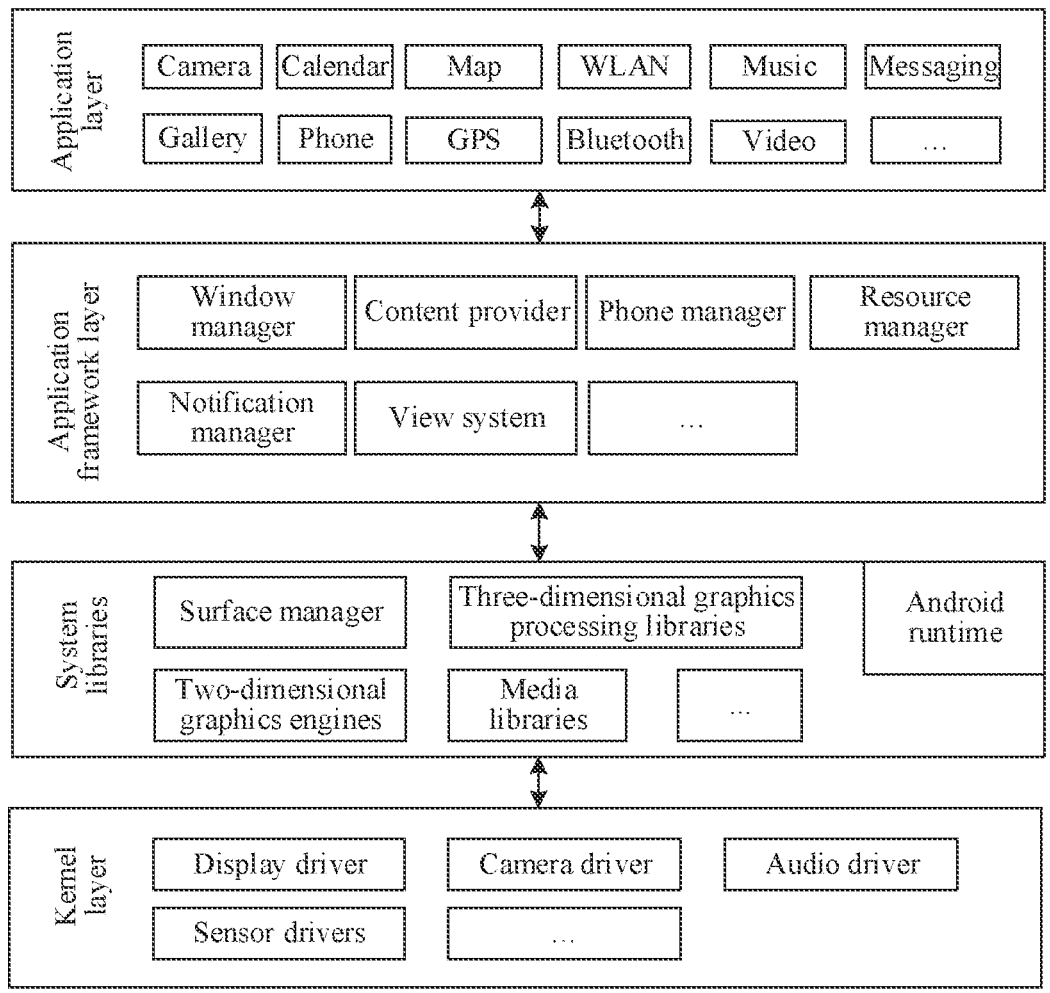
FIG. 2 is a schematic diagram of a software system of an apparatus to which this application is applicable.

As shown in FIG. 2, the software system with the layered architecture is divided into several layers, and each layer has clear roles and functions. The layers communicate with each other by using software interfaces. In some embodiments, the software system is divided into four layers. From top to bottom, the four layers are: an application layer, an application framework layer, Android runtime (Android runtime) and a system library, and a kernel layer.

The application layer may include applications such as camera, gallery, calendar, calls, map, navigation, WLAN. Bluetooth, music, video, and messaging.

The application framework layer provides an application programming interface (application programming interface, API) and a programming framework for applications at the application layer. The application framework layer includes some predefined functions.

For example, the application framework layer may include a window manager, a content provider, a view system, a phone manager, a resource manager, and a notification manager.

The window manager is used to manage window programs. The window manager can obtain a size of a display, and determine whether a status bar is present, whether lock a screen, or whether to take a screenshot.

The content provider is used to store and obtain data and allow the data to be accessed by applications. The data may include videos, images, audio, outgoing and received calls, a browsing history, bookmarks, and a phone book.

The view system includes visual controls, for example, controls with text displayed and controls with pictures displayed. The view system may be used to build applications. A display screen may include one or more views. For example, a display screen including an SMS notification icon may include a text display view and a picture display view.

The phone manager is configured to provide a communication function of the electronic device 100, for example, management of a call status (including answering or disconnected).

The resource manager provides various resources for applications, for example, localized strings, icons, pictures, layout files, and video files.

The notification manager turns on an application to display notification information in a status bar, and may be configured to convey a notification-type message. The displayed information may automatically disappear after a short stay, without user interaction. For example, the notification manager is configured to notify a user of completion of downloading, provide a message notification, and the like. The notification manager may alternatively provide a notification, such as a notification of an application running in the background, appearing in a form of a chart or scroll bar text in atop status bar of the system. The notification manager may alternatively provide a notification appearing in a form of a dialog window on the screen. For example, text information is displayed in the status bar, an alert sound is played, the electronic device vibrates, or an indicator lamp blinks.

The Android runtime includes a core library and a virtual machine. The Android runtime is responsible for scheduling and managing an Android system.

The core libraries include functional functions that the java language needs to call and core libraries of Android.

The application layer and the application framework layer run on the virtual machine. The virtual machine executes java files of the application layer and the application framework layer as binary files. The virtual machine is used to perform functions such as object life cycle management, stack management, thread management, security and exception management, and garbage collection.

The system libraries may include a plurality of functional modules, for example, a surface manager (surface manager), a media library (Media Libraries), a three-dimensional graphics processing library (for example, open graphics library for embedded systems (open graphics library for embedded systems, OpenGL ES)), and a 2D graphics engine (for example, skia graphics library (skia graphics library, SGL)).

The surface manager is configured to manage a display subsystem, and provides blending of 2D layers and 3D layers for a plurality of applications.

The media library supports playback and recording in a plurality of audio formats, playback and recording in a plurality of video formats, and still image files. The media library can support a variety of audio and video encoding formats, such as, MPEG4, H.264, moving picture experts group audio layer III (moving picture experts group audio layer III, MP3), advanced audio coding (advanced audio coding. AAC), adaptive multi-rate (adaptive multi-rate, AMR), joint photographic experts group (joint photographic experts group, JPG), and portable network graphics (portable network graphics, PNG).

The three-dimensional graphics processing library may be used to implement three-dimensional graphics drawing, image rendering, synthesis, and graphic layer processing.

The two-dimensional graphics engine is a drawing engine for 2D drawing.

The kernel layer is a layer between hardware and software. The kernel layer may include driver modules, such as a display driver, a camera driver, an audio driver, and a sensor driver.

The following exemplarily describes a working procedure of the software system and the hardware system of the electronic device 100 in combination with photographing scenes.

When the user performs a touch operation on the touch sensor 180K, a corresponding hardware interrupt is sent to the kernel layer, and the kernel layer processes the touch operation into a raw input event. The raw input event includes information such as touch coordinates and time stamp of the touch operation. The original input event is stored in the kernel layer, and the application framework layer obtains the raw input event from the kernel layer, identifies a control corresponding to the raw input event, and notifies an application (application, APP) corresponding to the control. For example, the touch operation is a tap operation, and the APP corresponding to the control is the camera APP. After the camera APP is awakened by the tap operation, a camera driver of the kernel layer may be called through the API, and the camera 193 can be controlled by the camera driver to perform shooting.

Currently, 3D LUT is usually used in ISP during image processing. To implement a 3D LUT function in the electronic device, it is necessary to load a color lookup table and perform calculation of three-dimensional interpolation. The color lookup table is a three-dimensional mapping table between discrete original color data and corrected color data. For example, the color data may be composed of three components (for example, R, G, and B components), and color correction of the images is implemented through discrete sampling at equal intervals on three components of the original color data. However, implementation of the 3D LUT function imposes relatively high requirements on a storage size and computing capability of the electronic device. In a case with a limited storage size or with constraints on performance and power consumption, for example, for video shooting in a slow motion mode or a shooting mode with a high frame output rate, the electronic devices cannot meet the requirements for using the 3D LUT.

In the embodiments of this application, the electronic device may determine a first mapping in gamma processing and a second mapping in a two-dimensional lookup table in response to a detected first operation; and processes a to-be-processed image based on the first mapping and the second mapping to obtain a first image. Because the second mapping in the two-dimensional lookup table and the first mapping in the gamma processing are used to process the to-be-processed image in the embodiments of the present invention, and the first mapping is associated with the second mapping, compared with processing of to-be-processed images by using a three-dimensional lookup table, the image processing method in this application can effectively reduce computational load of the electronic device.

The image processing method in the embodiments of this application is described in detail below with reference to application scenarios in the embodiments of this application.

Figure 3:
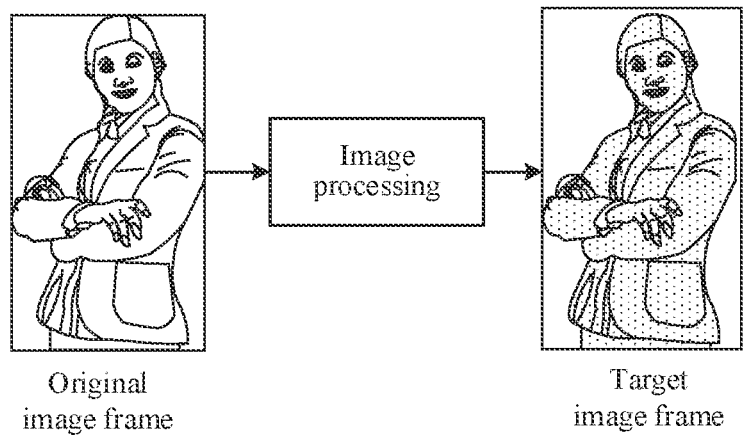
FIG. 3 is a schematic diagram of an application scenario according to an embodiment of this application.

For example, as shown in FIG. 3, the image processing method in this application may be applied to image color style processing. For example, a color style of a video (or an image) may be adjusted based on user requirements, to achieve various special effects of the image.

For example, an original image frame may be obtained, and image processing is performed on the original image frame to obtain a target image frame. The original image frame may be an image in an RGB color space, and image processing may be performed on the original image frame based on the LUT to obtain the target image frame. It may be considered as a function, and color information of each pixel may be relocated based on the LUT to obtain a new color value.

The following describes in detail the image processing method in the embodiments of this application with reference to FIG. 4 to FIG. 42.

Application scenario 1: An image frame is obtained through processing based on a two-dimensional lookup table to obtain a target image frame, for example, an image color style corresponding to the 2D LUT is selected from a camera for video shooting.

It should be understood that the image style may be a filter effect on a camera screen.

In an example, the image processing method provided in this embodiment of this application may be applied to video shooting. During video shooting, a slow motion mode of the camera may be selected, and LUT may be tapped in the slow motion mode, where the LUT may be a 2D LUT. On a preview screen of the 2D LUT, a target image style may be selected based on user requirements, and then the camera may shoot a video in real time based on the target image style to obtain a target video.

Figure 4:
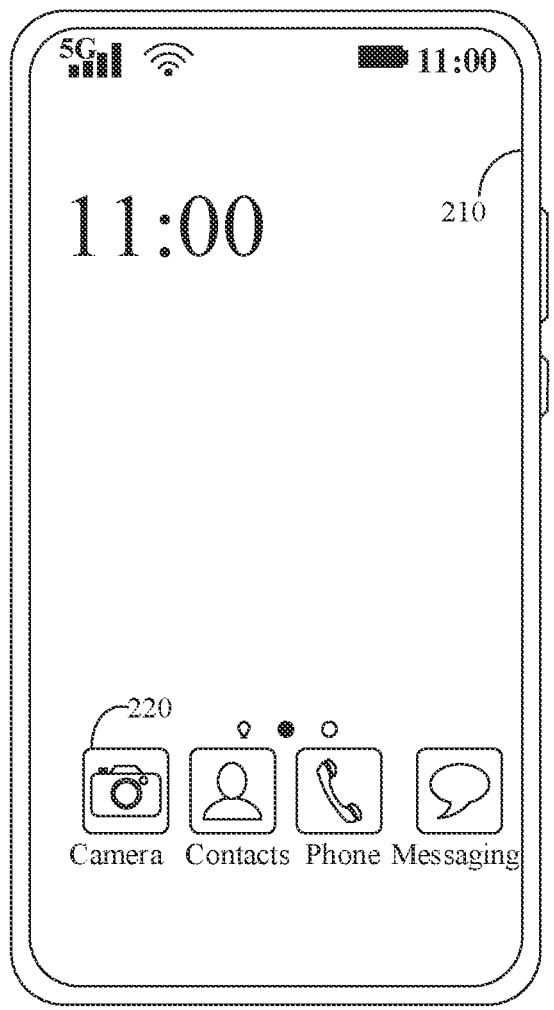
FIG. 4 is a schematic diagram of a display screen of an electronic device according to an embodiment of this application.

For example, FIG. 4 illustrates a graphical user interface (graphical user interface, GUI) of an electronic device, where the GUI is a home screen 210 of the electronic device. When detecting that a user taps an icon 220 of a camera application (application, APP) on the home screen 210, the electronic device may start the camera application and display another GUI shown in FIG. 5. The GUI shown in FIG. 5 may be a display screen of the camera APP in a photo mode. The GUI may include a shooting screen 230, and the shooting screen 230 may include a viewfinder frame 231 and a shoot control. For example, the shooting screen 230 may include a control 232 for indicating shooting. In a preview state, a preview image may be displayed in the viewfinder frame 231 in real time. The preview state may be a state after the user turns on the camera and before the user taps a photo/record button, and in this case, the preview image can be displayed in real time in the viewfinder frame.

It should be understood that a size of the viewfinder frame 231 may be the same or different in the photo mode and a video mode. For example, the viewfinder frame 231 may be a viewfinder frame in the photo mode. In the video mode, the viewfinder frame 231 may alternatively be a whole display.

Figure 5:
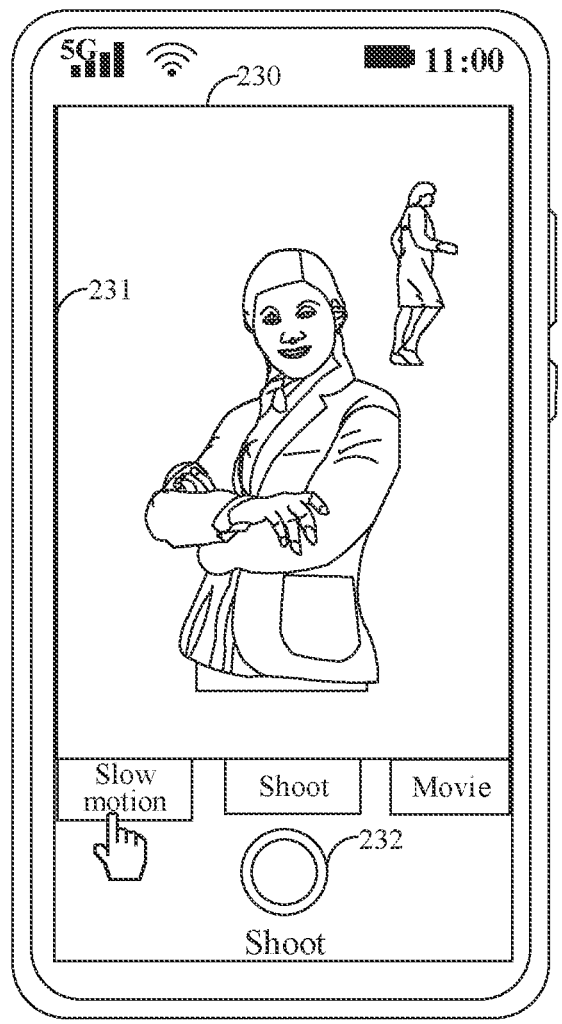
FIG. 5 is a schematic diagram of a display screen of an electronic device according to an embodiment of this application.

After the camera application is started, a photo mode screen may be displayed. The electronic device may detect a user's operation of tapping a slow motion mode, and the electronic device enters the slow motion mode in response to the user's operation, as shown in FIG. 5. The shooting screen 230 may further include a slow motion option. After detecting that the user taps the slow motion option, the electronic device may display a screen shown in FIG. 8.

Figure 6:
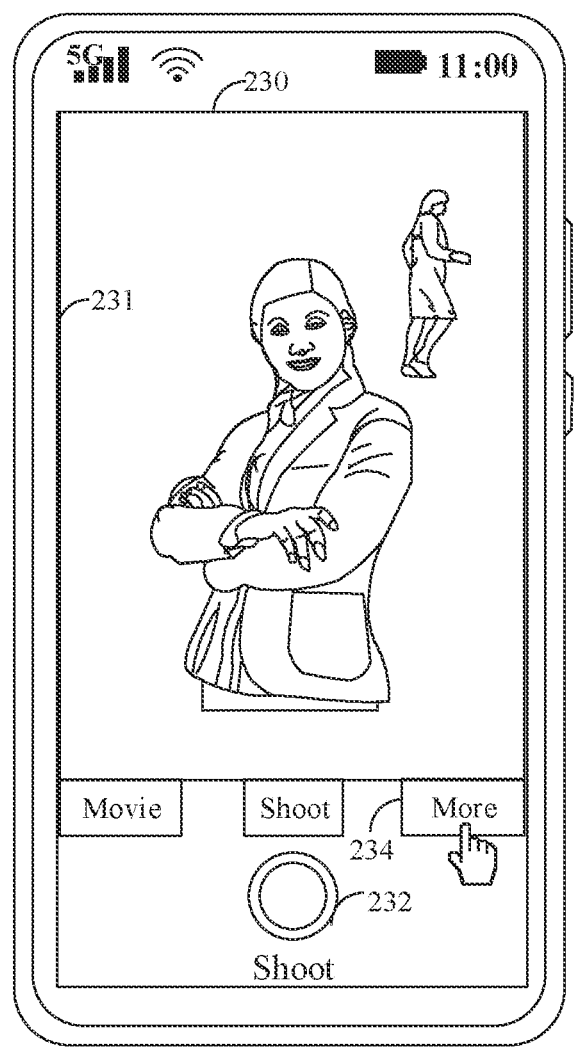
FIG. 6 is a schematic diagram of a display screen of an electronic device according to an embodiment of this application.
Figure 7:
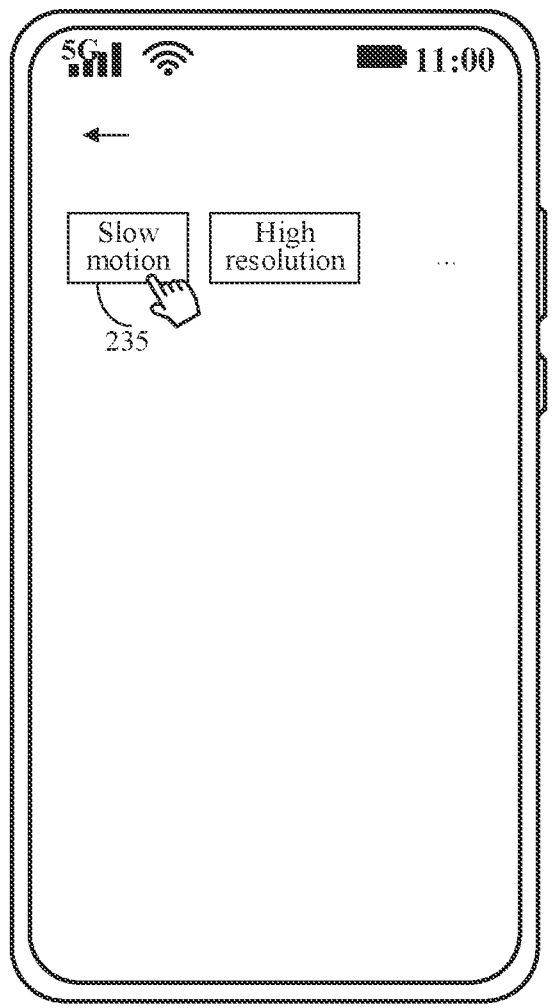
FIG. 7 is a schematic diagram of a display screen of an electronic device according to an embodiment of this application.

In an example, as shown in FIG. 6, in the shooting mode, the shooting screen 230 may further include a more option 234. After detecting that the user taps the more option 234, the electronic device displays a setting screen shown in FIG.

7. The setting screen may include options such as slow motion and high resolution. Based on shooting requirements of the user, the slow motion option 235 on the setting screen is tapped, and the screen shown in FIG. 8 is displayed, that is, the camera enters the slow motion mode.

Figure 8:
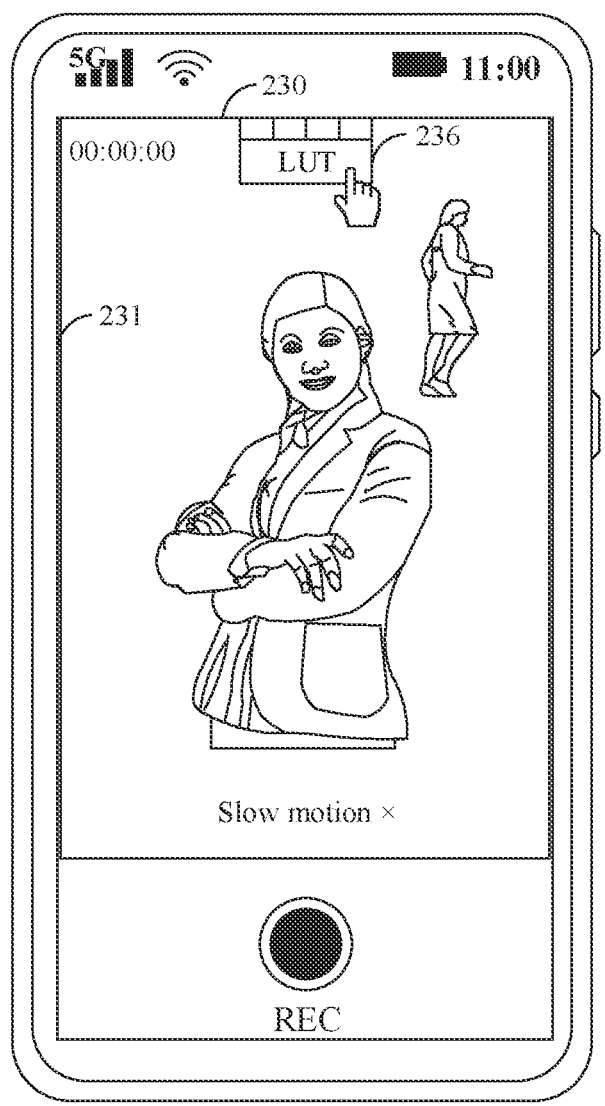
FIG. 8 is a schematic diagram of a display screen of an electronic device according to an embodiment of this application.

As shown in FIG. 8, in the slow motion mode of the camera, a LUT option 236 may be further included in the shooting screen 230. After detecting a user's operation of tapping the LUT option 236, the electronic device displays a screen shown in FIG. 9. The shooting screen may display a preview frame 237 with a plurality of different image styles (also referred to as filter effects), and the preview frame 237 may include style 1, style 2, style 3, and other image styles. The image styles may include but are not limited to images styles, such as green and orange, warm sunshine, glow, and cyberpunk.

Figure 9:
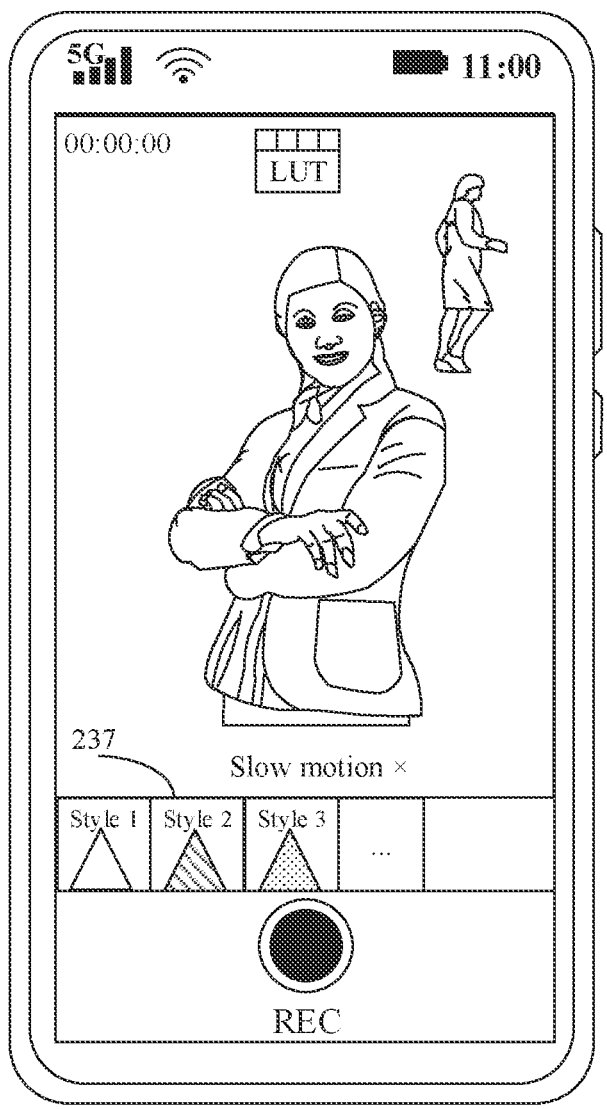
FIG. 9 is a schematic diagram of a display screen of an electronic device according to an embodiment of this application.
Figure 10:
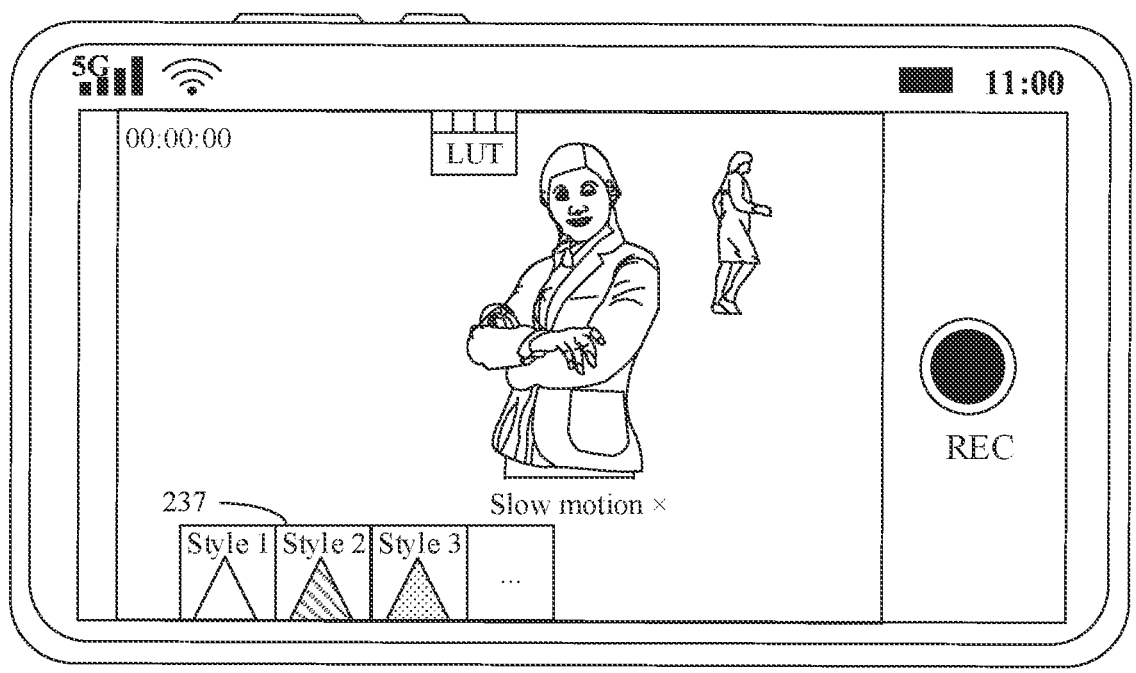
FIG. 10 is a schematic diagram of a display screen of an electronic device according to an embodiment of this application.

It should be understood that FIG. 9 may be a shooting screen in the LUT mode when the electronic device is in a portrait mode, and FIG. 10 may be a shooting screen in the LUT mode when the electronic device is in a landscape mode. Based on a state of using the electronic device by the user, the electronic device may determine to display in a portrait or landscape mode.

It should be further understood that the image styles displayed in the preview frame 237 in FIG. 9 and FIG. 10 are described as examples, the preview frame may also include other image styles, and the names of the image styles are for illustration, which is not limited in this application.

Figure 11:
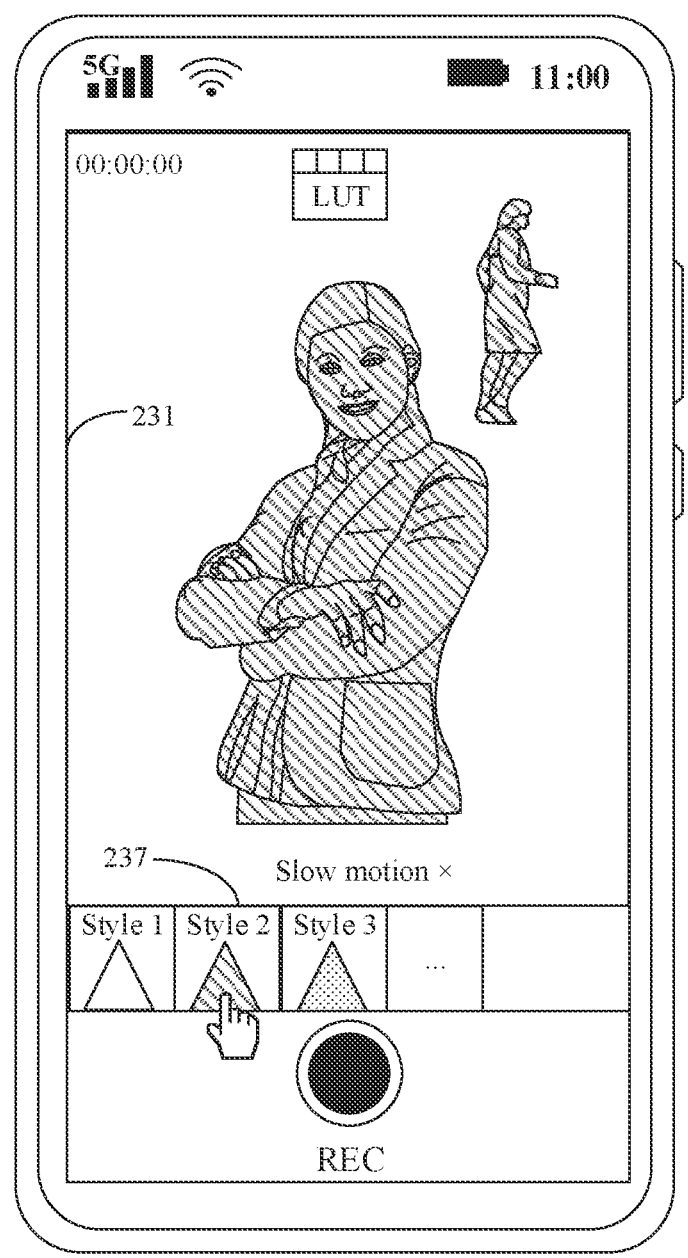
FIG. 11 is a schematic diagram of a display screen of an electronic device according to an embodiment of this application.
Figure 12:
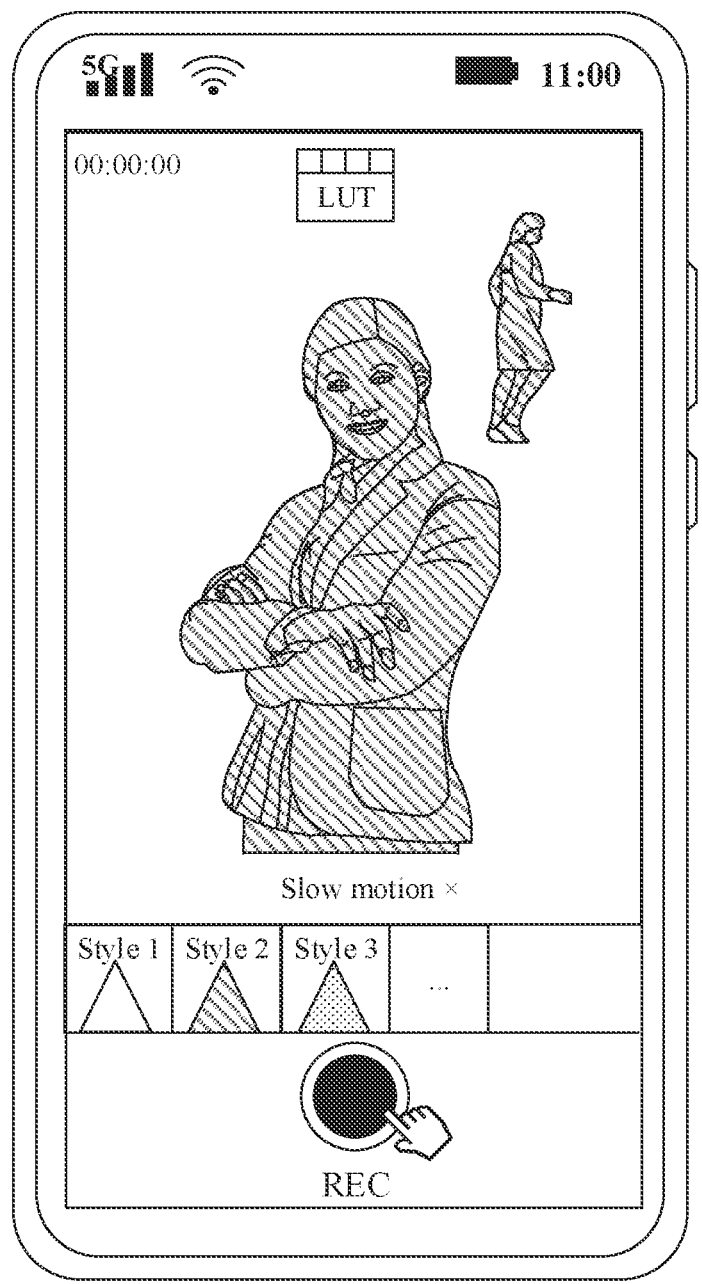
FIG. 12 is a schematic diagram of a display screen of an electronic device according to an embodiment of this application.

In an example, using the shooting screen shown in FIG. 11 as an example, the electronic device detects that the user taps style 2 in the preview frame 237, and displays a preview image of style 2 in the viewfinder frame 231, as shown in FIG. 11. Similarly, the user may tap another image style in the preview frame 237 for preview. After the user selects a target image style (that is, a target filter effect), a preview image corresponding to the target image style is displayed in the viewfinder frame 231. As shown in FIG. 12, after the user determines the target image style, the electronic device detects that the user taps a control indicating video recording. In response to the user's operation, the electronic device starts video recording, that is, the electronic device enters video shooting.

It should be noted that, after the user selects one image style, a preview image displayed in the preview frame 231 is an image corresponding to the image style.

In a possible implementation, in the slow motion mode (which is an example of a first shooting mode), the electronic device may display a first screen, where the first screen includes a first control; and detects a first operation on the first control. In response to the first operation, the electronic device may determine a first mapping in gamma processing and a second mapping in a two-dimensional lookup table. The first screen may be a screen shown in FIG. 9, and the first control may be a control for indicating style 2. Detecting the first operation on the first control may be detecting that the user taps the control for indicating style 2, as shown in FIG. 11. By detecting the first operation on the first control, the electronic device determines a target two-dimensional lookup table corresponding to style 2 shown in FIG. 11, which may be the second mapping in the two-dimensional lookup table.

It should be noted that the foregoing uses the first operation being a tap operation as an example for description. The first operation may alternatively be an operation of selecting the first control by voice, or may include another behavior for indicating the electronic device to select the first control. The foregoing provides descriptions by using examples, which do not constitute any limitation on this application.

Figure 13:
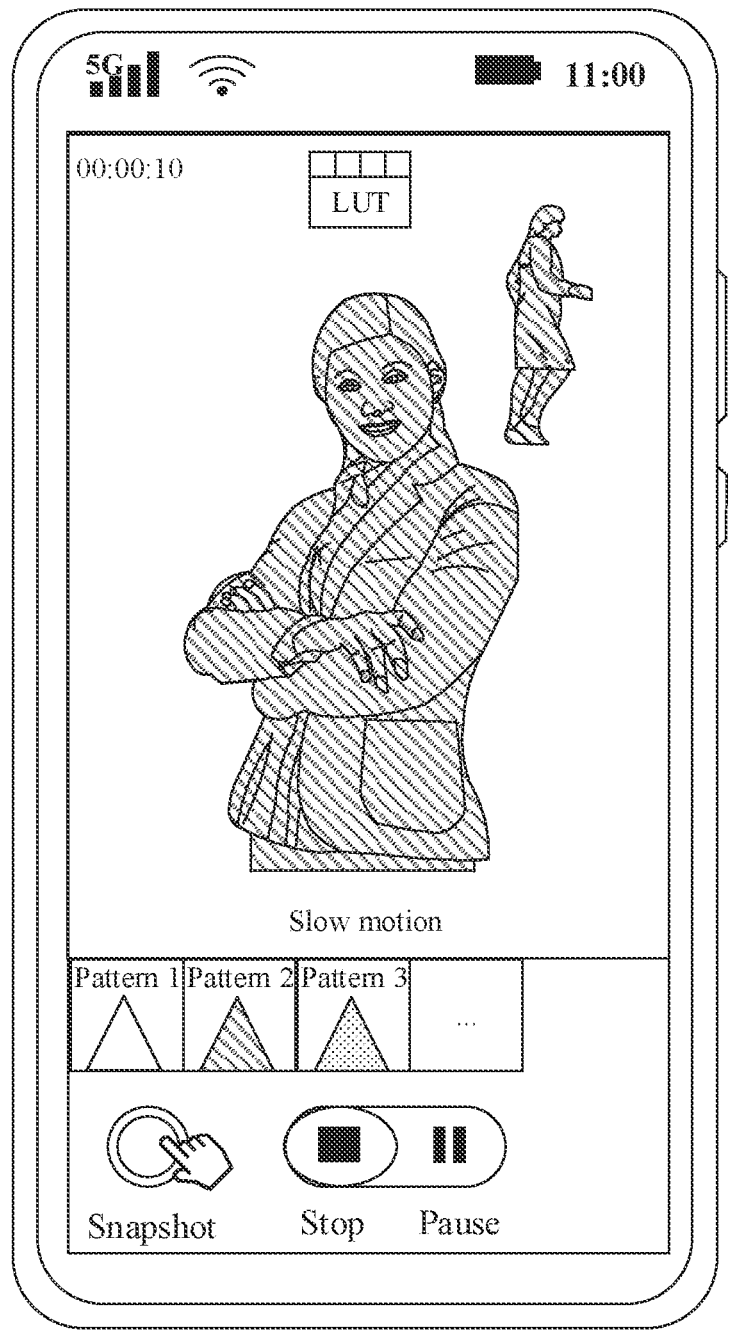
FIG. 13 is a schematic diagram of a display screen of an electronic device according to an embodiment of this application.

In an example, as shown in FIG. 13, the shooting screen may further include a control for indicating stop or pause. During video shooting, a snapshot control may be tapped to capture an image, and a style of the captured image is the same as that selected for a shot video.

For example, after the user selects a target image style, a preview image displayed in the shooting screen may be totally switched to the target image style. The shooting screen shown in FIG. 9 may be a preview image in an original image pattern. The shooting screen shown in FIG. 11 may be a preview image of style 2.

For example, after the user selects a target image style, part of the preview image in the shooting screen may alternatively be switched to the target image style.

Figure 14:
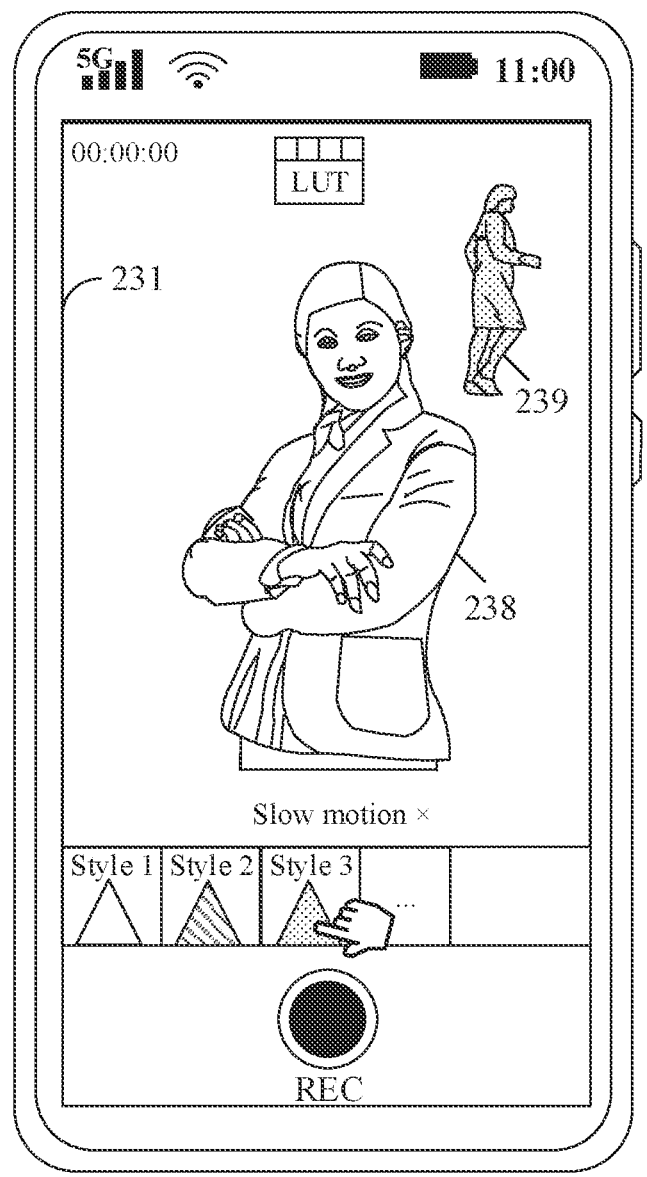
FIG. 14 is a schematic diagram of a display screen of an electronic device according to an embodiment of this application.
Figure 15:
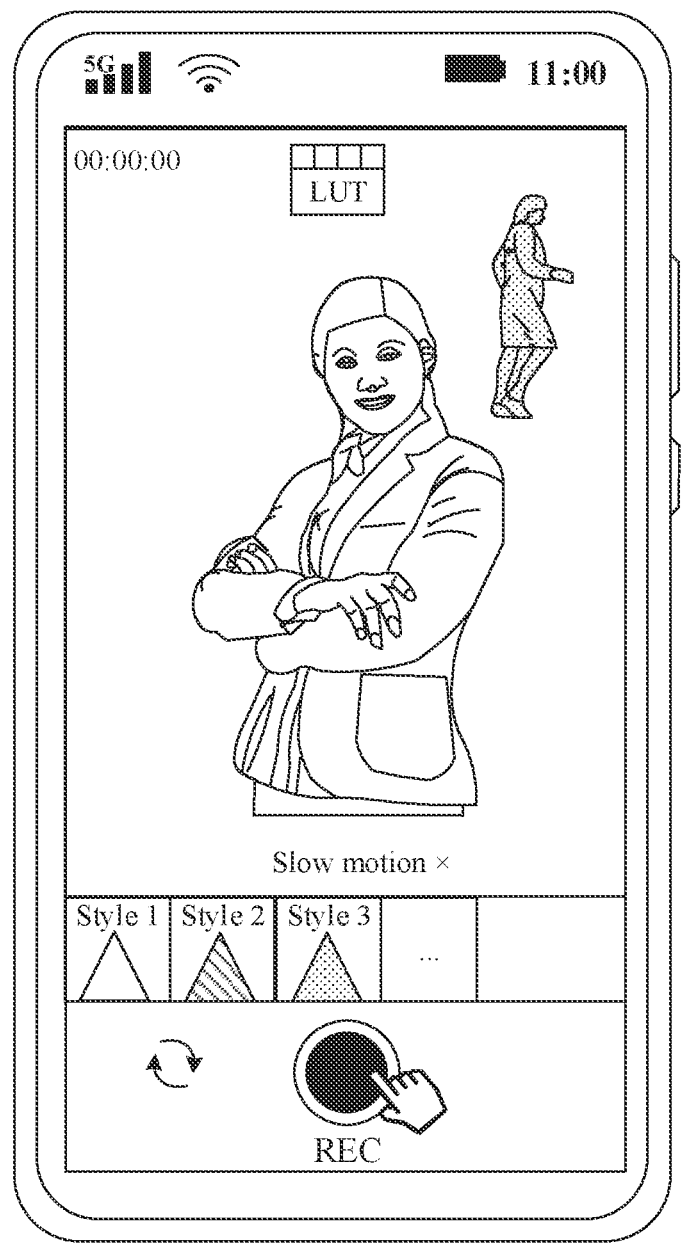
FIG. 15 is a schematic diagram of a display screen of an electronic device according to an embodiment of this application.

For example, as shown in FIG. 14, when the user taps style 3 in the preview frame 237, the electronic device may identify a target object and a background object in the preview image based on the preview image in the viewfinder frame 231, and performs style 3 processing on the background object while keeping the target object in the original image pattern. For example, the electronic device may determine the target object and the background object based on distances between different objects and the electronic device. As shown in FIG. 14, the viewfinder frame 231 may include a target object 238 and a background object 239. After selecting style 3 by the user is detected, style 3 processing is performed on the background object, and a screen shown in FIG. 15 is displayed. After the user determines style 3, the electronic device detects that the user taps the control indicating video recording; and in response to the user's operation, the electronic device starts video recording, that is, performing video shooting by using style 3.

It should be noted that in FIG. 11 to FIG. 15, a target image style is determined based on selection of the user. In a possible implementation, the electronic device may alternatively determine a target image style automatically based on an identified shooting scene. For example, an artificial intelligence (Artificial Intelligence, AI) color grading mode may be set for the camera, so that the electronic device automatically determines a target image style based on an identified shooting scene during video shooting or image photographing.

In a possible implementation, in the slow motion mode (which is an example of the first shooting mode), the electronic device may display a first screen, where the first screen includes a first control; and detects a first operation on the first control. In response to the first operation, the electronic device may determine a first mapping in gamma processing and a second mapping in a two-dimensional lookup table. The first screen may be a setting screen of the camera application; and the first control may be a control for AI movie color grading. Detecting the first operation on the first control may be detecting, by the electronic device, an operation of determining an image style based on an identified shooting scene.

It should be understood that the user's operation for indicating a video recording behavior may include tapping the record control by the user, or may include indicating the electronic device by the user by voice to perform a video recording behavior, or may include indicating the electronic device by the user using another instruction to perform a video recording behavior. The foregoing provides descriptions by using examples, which do not constitute any limitation on this application.

The foregoing describes, with reference to FIG. 4 to FIG. 15, graphics display screens of the electronic device on which the user operates, and the following describes, with reference to FIG. 16 to FIG. 19, an image processing algorithm run by the electronic device.

Figure 16:
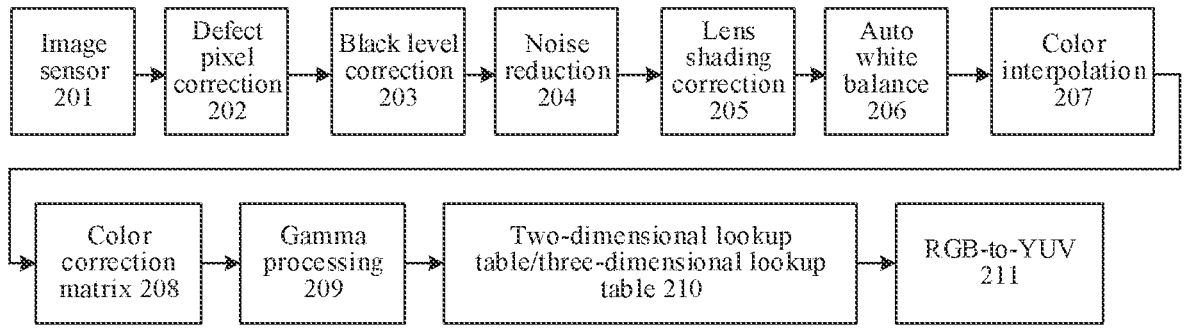
FIG. 16 is a schematic diagram of a processing procedure of an image processor according to an embodiment of this application.

FIG. 16 is a schematic diagram of a processing procedure of an image processor according to an embodiment of this application.

An image sensor 201 is configured to convert, by using a photoelectric conversion function of a photoelectric component, a light image on a photosensitive surface into an electrical signal in a proportional relationship with the light image.

Defect pixel correction 202 (Defect Pixel Correction, DPC) is used to resolve a defect in an array formed by light points captured on a sensor, or an error in a process of converting a light signal. A defect pixel is usually eliminated by calculating an average of other surrounding pixels in a brightness domain.

Black level correction 203 (Black Level Correction, BLC) is used to correct a black level. The black level is a video signal level at which no line of light is output on a display apparatus that has been calibrated to some extent. Reasons for the black level correction are as follows: On one hand, due to a dark current existing in an image sensor, there is still a pixel voltage output when there is no light irradiation. On the other hand, because the image sensor has insufficient precision during analog-to-digital conversion, for example, using 8 bits (bit) as an example, an effective range of each pixel is 0-255, the image sensor may not be able to convert information close to 0. Based on user's visual characteristics (sensitive to dark details), an image sensor manufacturer may generally add a fixed offset during analog-to-digital conversion to make an output pixel between 5 (non-fixed value) and 255, then transmits the pixel to an ISP for subtraction processing, and adjusts the pixel 5 (non-fixed value) to 0, to make each pixel fall within an effective range of 0-255.

Noise reduction 204 may be used to reduce noise in an image. The noise in the image affects user's visual experience. Therefore, image quality of the image can be improved to some extent through noise reduction.

Lens shading correction 205 (Lens Shading Correction, LSC) is used to eliminate color and brightness inconsistency caused between a periphery of an image and a center of the image due to a lens optical system.

Auto white balance 206 (Auto White Balance, AWB) is used to make a camera to restore white at any color temperature to white. Due to the influence of color temperature, a piece of white paper becomes yellowish at low color temperature and bluish at high color temperature. The white balance is intended to make a white object meet R=G=B at any color temperature and appear white.

Color interpolation 207 is used to allow each pixel to have three components RGB.

Color correction matrix 208 (Color Correction Matrix, CCM) is used to calibrate accuracy of a color other than white. Gamma processing 209 is used to adjust brightness, contrast, a dynamic range, and the like of an image by adjusting a gamma curve. The two-dimensional lookup table and the three-dimensional lookup table 210 are used for image color correction. The lookup table may be considered as a function, and a new color value may be obtained from color information of each pixel through mapping of the lookup table. RGB-to-YUV 211 is to convert the color value obtained through mapping of the lookup table to luminance and chrominance, where Y represents luminance (Luminance or Luma), which is a grayscale value; and U and V represent chrominance (Chrominance or Chroma).

It should be noted that the image processing method provided in this embodiment of this application may be applied to a processing flow of the gamma processing 209 and the two-dimensional lookup table/three-dimensional lookup table 210.

Figure 17:
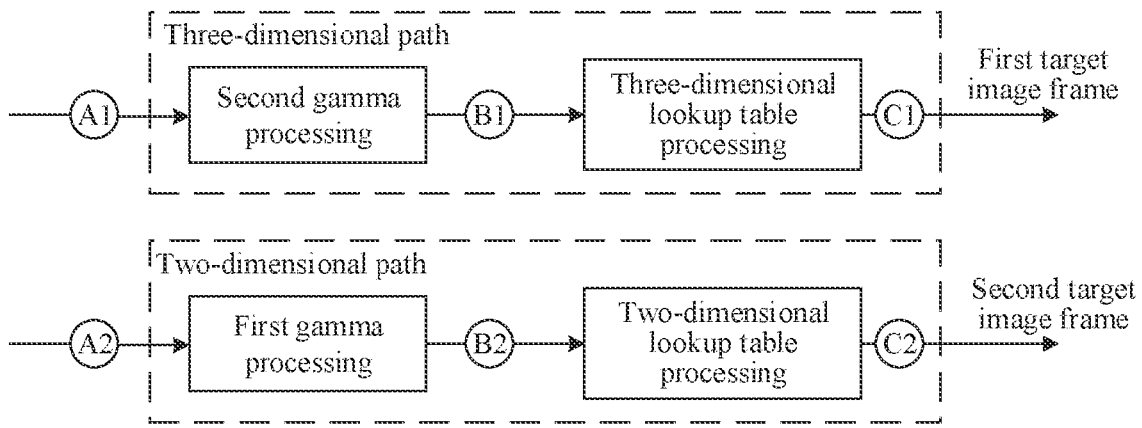
FIG. 17 is a schematic diagram of a method for determining a two-dimensional lookup table according to an embodiment of this application.

FIG. 17 is a schematic diagram of a method for creating a two-dimensional lookup table according to an embodiment of this application.

It should be understood that in a three-dimensional path shown in FIG. 17, image processing is performed on an original image frame by using a 3D LUT to obtain a first target image frame; and in a two-dimensional path, image processing is performed on an original image frame by using a 2D LUT to obtain a second target image frame. In this embodiment of this application, in a scenario with constraints on performance of the electronic device, similar or same image colors and image styles may be implemented for the second target image frame and the first target image frame through image processing using the two-dimensional path. The first target image frame and the second target image frame may be image frames in an RGB color space.

For example, as shown in FIG. 17, to implement similar or same image colors and image styles for the second target image frame and the first target image frame, a function of first gamma processing (which is an example of a first mapping of the gamma processing) and a two-dimensional lookup table can be determined based on an obtained function of second gamma processing (an example of a third mapping of the gamma processing) and a three-dimensional lookup table.

For example, the process of creating a two-dimensional lookup table includes the following steps.

Step 1: Obtain data. For example, a hue saturation lightness (Hue Saturation Lightness, HSL) color space is evenly divided into H*S*L grid points (for example, the number of grid points in a hue direction is 25, the number of grid points in a saturation direction is 17, the number of grid points in a lightness direction is 257), to generate a corresponding initial HSL image (an example of an image in an initial first color space) and a corresponding initial RGB image (an example of an image in an initial second color space).

Step 2: The initial RGB image may be an RGB image at node B1 in the three-dimensional path; and color correction is performed on the RGB image at node B1 based on a three-dimensional lookup table (which is an example of a fourth mapping in the three-dimensional lookup table) to obtain an RGB image at node C1, that is, the first target RGB image.

Step 3: Perform inverse second gamma processing on the RGB image at node B1 to obtain an RGB image corresponding to node A1.

Step 4: For the two-dimensional path, obtain the RGB image at node A1, and extract gray pixels (that is, pixels with hue=0 and saturation=0) of the RGB image at node A1 as gray pixels $(x_k^r, x_k^g, x_k^b)$ of an RGB image at node A2; use the gray pixels $(x_k^r, x_k^g, x_k^b)$ of the RGB image at node A2 as input data, and use gray pixels $(y_k^r, y_k^g, y_k^b)$ of the RGB image at node C1 as output data, where a corresponding position is a position of a gray pixel before mapping based on the three-dimensional lookup table; and perform fitting on $(x_k^r, y_k^r)$, $(x_k^g, y_k^g)$, and $(x_k^b, y_k^b)$, where three curves obtained through fitting are gamma curves corresponding to three channels of r, g, and b, that is, parameters corresponding to the first gamma processing are obtained.

Step 5: Use the initial RGB image generated in step 1 as an RGB image at node B2, perform inverse first gamma processing on the image to obtain an RGB image at node A2; use the RGB image at node A2 as an RGB image at node A1, and then perform second gamma processing on the RGB image at node A1 to obtain an RGB image at node B1; perform three-dimensional lookup table processing on the RGB image at node B1 to obtain an RGB image at node C1; convert the RGB image (which is an example of a third image) at node C1 to an HSL color space (which is an example of a second color space) to obtain an HSL image (which is an example of a fourth image) at node C1; and use the initial HSL image generated in step 1 as an HSL image at node B2, use the HSL image $(x_i^h, x_j^s, x_k^l)$ at node B2 as input data, use the HSL image $(y_i^h, y_j^s, y_k^l)$ at node C1 as output data, and then calculate a difference between $(x_i^h, x_j^s, x_k^l)$ and $(y_i^h, y_j^s, y_k^l)$ to obtain a two-dimensional lookup table corresponding to hue and saturation.

In an example, a difference between $(y_i^h, y_j^s, y_k^l)$ and $(x_i^h, x_j^s, x_k^l)$ may be calculated to obtain a hue adjustment amount, a saturation adjustment amount, and a lightness adjustment amount corresponding to the initial HSL image, denoted as $(\text{offset}_i^h, \text{offset}_j^s, \text{offset}_k^l)$ respectively. A fixed lightness value is obtained based on $(\text{offset}_i^h, \text{offset}_j^s, \text{offset}_k^l)$, so as to obtain a two-dimensional lookup table corresponding to hue and saturation.

In an example, in a case with a fixed lightness value, hue and saturation differences between $(y_i^h, y_j^s, y_k^l)$ and $(x_i^h, x_j^s, x_k^l)$ may be calculated to obtain two-dimensional lookup tables corresponding to hue and saturation.

For example, a fixed lightness value is used in the HSL color space, and the hue may correspond to a two-dimensional lookup table. A horizontal axis of the two-dimensional lookup table corresponding to the hue may represent hue, and a vertical axis may represent saturation; and each value in the two-dimensional lookup table may represent a hue adjustment amount under such hue and saturation, as shown in Table 1.

TABLE 1

| Saturation/Hue | 0 degrees (hue) | 72 | 144 | 216 | 288 | 360 |
|---|---|---|---|---|---|---|
| 0 (saturation) | 15 (ΔH/degrees) | 20 | 10 | −5 | −10 | 15 |
| 0.25 | 10 | −10 | −15 | 10 | 5 | 10 |
| 0.5 | 5 | 5 | 10 | 15 | 20 | 5 |
| 0.75 | −15 | 10 | 5 | 20 | 15 | −15 |
| 1.0 | −20 | 15 | 20 | 20 | 20 | −20 |

For example, a fixed lightness value is used in the HSL color space, and the saturation may correspond to a two-dimensional lookup table. A horizontal axis of the two-dimensional lookup table corresponding to the saturation may represent hue, and a vertical axis may represent saturation; and each value in the two-dimensional lookup table may represent a saturation adjustment amount under such hue and saturation, as shown in Table 2.

TABLE 2

| Saturation/Hue | 0 degrees (hue) | 72 | 144 | 216 | 288 | 360 |
|---|---|---|---|---|---|---|
| 0 (saturation) | −0.1 (ΔS) | −0.02 | −0.08 | −0.1 | 0.02 | −0.1 |
| 0.25 | 0.05 | 0.05 | −0.1 | 0.1 | 0.04 | 0.05 |
| 0.5 | 0.03 | −0.08 | 0.05 | −0.04 | −0.06 | 0.03 |
| 0.75 | 0.04 | 0.04 | 0.04 | 0.05 | 0.07 | 0.04 |
| 1.0 | −0.05 | −0.05 | 0.02 | 0.08 | 0.05 | −0.05 |

In an example, assuming i=0-24, j=0-16, and k=0-256, k=128 (that is, lightness=0.5, a data range 0.0 to 1.0) is used. That is, in a case that a fixed lightness value is used, corresponding $(\text{offset}_i^h, \text{offset}_j^s)$ are used, that is, a hue adjustment amount and a saturation adjustment amount at corresponding coordinate positions of the two-dimensional lookup table.

It should be understood that other lightness values can be alternatively used in place of the fixed lightness value; however, it is necessary to avoid lightness values of excessive brightness and excessive darkness, because some other adjustments may be performed on excessively bright or dark pixels in the 3D LUT due to problems such as noise or overexposure.

It should be further understood that the foregoing process of creating a two-dimensional lookup table is performed in the HSL color space; similarly, processing may alternatively be performed in a hue, saturation, and value (Hue Saturation Value, HSV) color space, where H indicates hue, S indicates saturation, and V indicates value.

Figure 18:
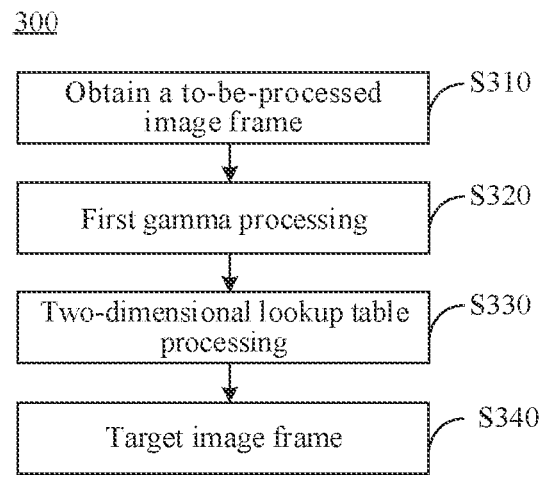
FIG. 18 is a schematic diagram of an image processing method according to an embodiment of this application.

FIG. 18 is a schematic flowchart of an image processing method according to an embodiment of this application. The method 300 includes step S310 to step S340, and the following describes in detail the steps.

It should be understood that first gamma processing and two-dimensional lookup table processing shown in FIG. 18 are the same as the first gamma processing and the two-dimensional lookup table processing shown in FIG. 17. In other words, parameters corresponding to the first gamma processing and the two-dimensional lookup table can be determined by using the method shown in FIG. 17.

Step S310: Obtain a to-be-processed image frame (which is an example of a to-be-processed image).

For example, the to-be-processed image frame may be an image captured in real time by an electronic device by using a camera; and the real-time captured image may be an image output by a CCM 208.

It should be understood that the to-be-processed image frame may be an image requiring color correction.

Step S320: Perform first gamma processing on the to-be-processed image frame (an example of a first mapping of gamma processing).

For example, first gamma processing is performed on a to-be-processed RGB image based on three curves obtained through fitting in step 4 of FIG. 17, where the three curves are gamma curves corresponding to the three channels of r, g, and b.

Further, an image obtained through first gamma processing may be converted from an RGB color space to an HSL color space.

Step S330: Perform two-dimensional lookup table processing (which is an example of a second mapping of the two-dimensional lookup table).

For example, two-dimensional lookup tables corresponding to different image styles may be generated by using the method shown in FIG. 17. Herein, the to-be-processed image may be processed based on a two-dimensional lookup table corresponding to a target image style, to obtain a target image, where the target image style may be an image style determined by the user, or the target image style may be an image style automatically recognized by the electronic device.

For example, an adjustment amount may be obtained based on the two-dimensional lookup table, to obtain a color-corrected image.

In an example, the user may select, based on a requirement, an image style for color correction on the to-be-processed RGB image, so that the electronic device determines a two-dimensional lookup table corresponding to the image style; and performs color correction on the to-be-processed RGB image based on the two-dimensional lookup table.

In an example, if an AI color grading pattern is set on the electronic device, the electronic device may automatically determine a target image style based on an identified shooting scene, and perform color correction on the to-be-processed RGB image based on a two-dimensional lookup table corresponding to the target image style.

In an example, for the HSL color space, a fixed L value may be used, and an after-correction H value and an after-correction S value may be obtained based on a two-dimensional lookup table corresponding to H and a two-dimensional lookup table corresponding to S, respectively. The after-correction H value may be obtained by adding a hue adjustment amount ΔH to an original H value; similarly, the after-correction S value may be obtained by adding a saturation adjustment amount ΔS to an original S value. The original H value and the original S value are an original H value and an original S value that are respectively obtained after raw RGB pixels are converted into the HSL color space, and ΔH and ΔS are obtained through a two-dimensional lookup table.

Step S340: Obtain a target image frame (which is an example of a first image).

For example, an HSL image obtained through two-dimensional lookup table processing in step S330 is converted into an RGB color space to obtain a target RGB image, and the target RGB image may be the target image frame.

In an example, the target image frame may be an RGB image with user-desired image effects that is obtained through color correction processing on a to-be-processed image based on a two-dimensional lookup table selected by the user.

In one example, the target image frame may be an RGB image obtained through color correction processing on a to-be-processed image based on a two-dimensional lookup table, where the two-dimensional lookup table is determined through scene detection by the electronic device.

It should be further understood that the description is provided by using an image as an example; similarly, what is obtained may alternatively be a to-be-processed video, and processing described above may be performed on each frame of image in the to-be-processed video, to obtain a target video.

In this embodiment of this application, the three-dimensional lookup table may be compressed to obtain a two-dimensional lookup table having similar or same effects as the three-dimensional lookup table, and color correction on the image based on the two-dimensional lookup table may implement similar image effects as that based on the three-dimensional lookup table. In a scenario with constraints on performance of the electronic device, the image processing method provided in this embodiment of this application can meet user requirements and implement different image effects.

Application scenario 2: A target video is obtained based on a three-dimensional lookup table and a two-dimensional lookup table. For example, in a shooting scene, the 3D LUT and 2D LUT may be switched in the camera depending on different scenes for video shooting.

In an example, the image processing method provided in this embodiment of this application may be applied to video shooting. During video shooting, a movie mode of the camera may be selected first, and 3D LUT may be tapped in the movie mode. In a preview screen of 3D LUT, a target image style may be selected based on a user requirement. The camera may perform video shooting in real time based on the target image style. In the process of video shooting, for a scene with a weak computing capability for the electronic device (for example, a scene requiring a high image frame output rate), a mode of the camera may be switched from the movie mode to a slow motion mode, and after switching to the slow motion mode, the 3D LUT is triggered to switch to a corresponding 2D LUT, so as to continue video shooting to obtain a target video.

Figure 19:
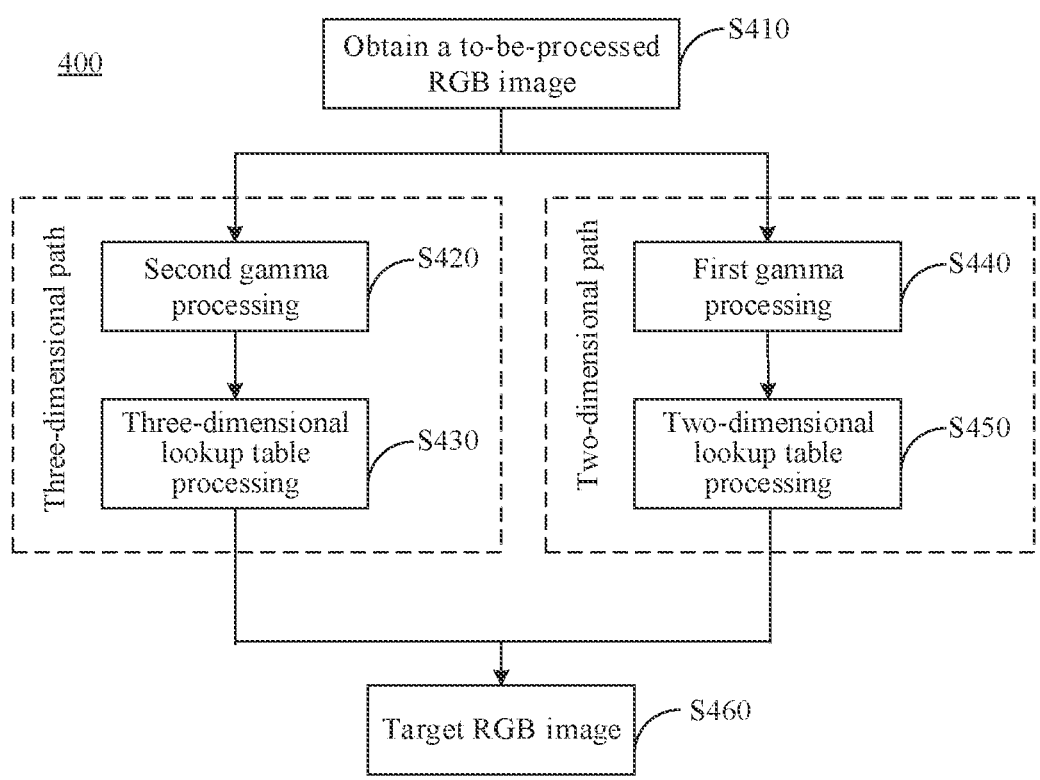
FIG. 19 is a schematic diagram of an image processing method according to an embodiment of this application.

FIG. 19 is a schematic flowchart of an image processing method according to an embodiment of this application. The method 400 includes step S410 to step S460, and the following describes in detail the steps.

It should be understood that the image processing method shown in FIG. 19 may be a process designed to have both a three-dimensional path and a two-dimensional path. To be specific, color correction may be performed on a to-be-processed image through the three-dimensional path; or color correction may be performed on a to-be-processed image through the two-dimensional path; or color correction processing may be performed on a to-be-processed image by switching between the three-dimensional path and the two-dimensional path based on specific requirements.

Step S410: Obtain a to-be-processed RGB image.

For example, the to-be-processed RGB image may be an image captured in real time by an electronic device by using a camera.

Step S420: Perform second gamma processing.

For example, second gamma processing may be gamma processing on the to-be-processed image by using gamma parameters of a 3D LUT in conventional technologies.

Step S430: Perform three-dimensional lookup table processing.

For example, three-dimensional lookup table processing may be processing on the to-be-processed RGB image by using a three-dimensional lookup table in conventional technologies.

Step S440: Perform first gamma processing.

For example, parameters corresponding to first gamma processing may be determined by using the method shown in FIG. 17; and R, G, and B pixel values of the to-be-processed RGB image may be adjusted through first gamma processing in the two-dimensional path.

Further, based on a type of the two-dimensional lookup table, an RGB image obtained through first gamma processing is converted from an RGB color space to an HSL color space or an HSV color space.

For example, if a fixed lightness value is used in the two-dimensional lookup table, the RGB image obtained through first gamma processing is converted from the RGB color space to the HSL color space; if a fixed brightness value is used in the two-dimensional lookup table, the RGB image obtained through first gamma processing is converted from the RGB color space to the HSV color space.

Step S450: Perform two-dimensional lookup table processing.

It should be understood that the two-dimensional lookup table has one less dimension than the three-dimensional lookup table; and therefore compared with the three-dimensional lookup table, a computing amount of the two-dimensional lookup table is reduced to some extent.

In an example, a fixed lightness value may be used for the HSL color space, and saturation and hue may be adjusted based on the two-dimensional lookup table.

In an example, for the HSL color space, a fixed L value may be used, and an after-correction H value and an after-correction S value may be obtained based on a two-dimensional lookup table corresponding to H and a two-dimensional lookup table corresponding to S, respectively. The after-correction H value may be obtained by adding a hue adjustment amount $\Delta H$ to an original H value; similarly, the after-correction S value may be obtained by adding a saturation adjustment amount $\Delta S$ to an original S value. The original H value and the original S value are an original H value and an original S value that are respectively obtained after raw RGB pixels are converted into the HSL color space, and $\Delta H$ and $\Delta S$ are obtained through a two-dimensional lookup table.

In an example, a fixed lightness value may be used for the HSV color space, and saturation and hue may be adjusted based on the two-dimensional lookup table.

In an example, for the HSL color space, a fixed brightness value may be used, and an after-correction H value and an after-correction S value may be obtained based on a two-dimensional lookup table corresponding to H and a two-dimensional lookup table corresponding to S, respectively. The after-correction H value may be obtained by adding a hue adjustment amount $\Delta H$ to an original H value; similarly, the after-correction S value may be obtained by adding a saturation adjustment amount $\Delta S$ to an original S value. The original H value and the original S value are an original H value and an original S value that are respectively obtained after raw RGB pixels are converted into the HSL color space, and $\Delta H$ and $\Delta S$ are obtained through a two-dimensional lookup table.

Further, an after-correction HSL image is converted from the HSL color space to the RGB color space, or an after-correction HSV image is converted from the HSV color space to the RGB color space.

Step S460: Obtain a target RGB image.

In an example, when the electronic device is recording a video, the user indicates the movie mode, and the user selects a target image style in the 3D LUT table in the movie mode to perform color correction on images in the video. At a moment, the electronic device receives a user's operation of switching to a slow motion mode, and in response to the user's operation, the electronic device may switch the target image style in the 3D LUT table to a 2D LUT table corresponding to the target image style, and perform color correction on the images in the video based on the 2D LUT.

Figure 20:
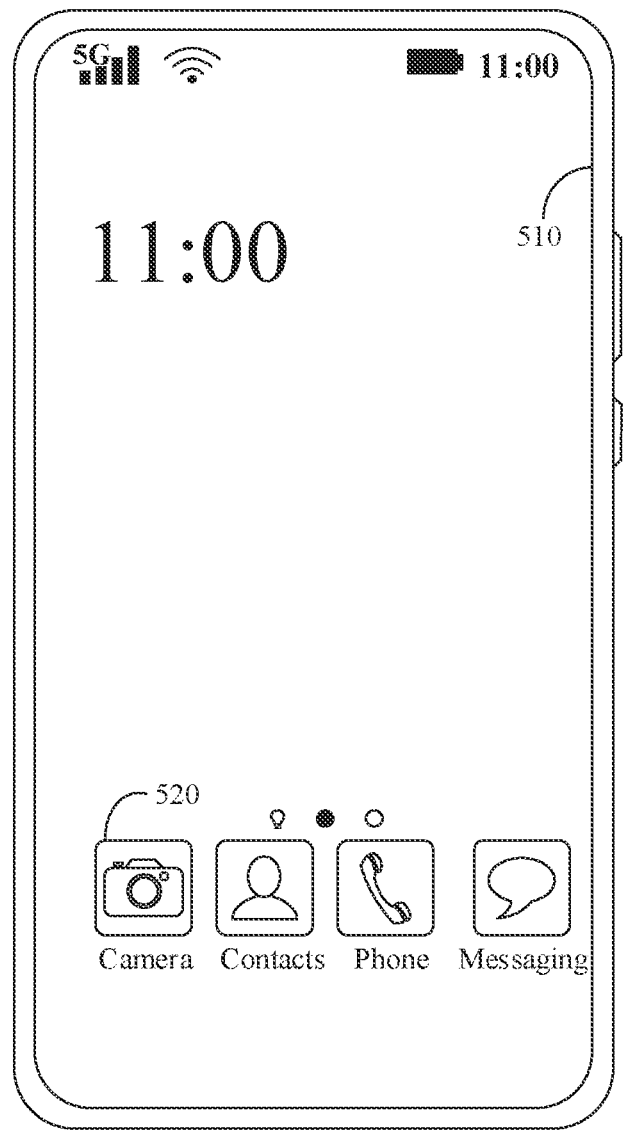
FIG. 20 is a schematic diagram of a display screen of an electronic device according to an embodiment of this application.

For example, FIG. 20 is a schematic diagram of a display home screen 510 of an electronic device. When detecting that a user taps an icon 520 of a camera application on the home screen 510, the electronic device may start the camera application and display another GUI shown in FIG. 21. The GUI shown in FIG. 21 may be a display screen of the camera APP in a movie mode. The GUI may include a shooting screen 530, and the shooting screen 530 may include a viewfinder frame 531 and a shoot control. For example, the shooting screen 530 may include a control 532 for indicating shooting. In a preview state, a preview image may be displayed in the viewfinder frame 531 in real time. The preview state may be a state after the user turns on the camera and before the user taps a photo/record button, and in this case, the preview image can be displayed in real time in the viewfinder frame.

Figure 21:
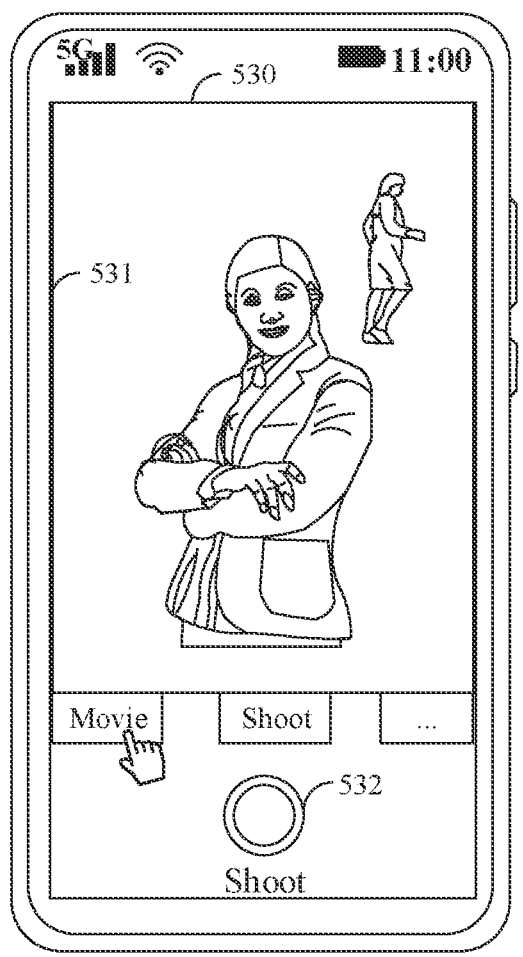
FIG. 21 is a schematic diagram of a display screen of an electronic device according to an embodiment of this application.
Figure 22:
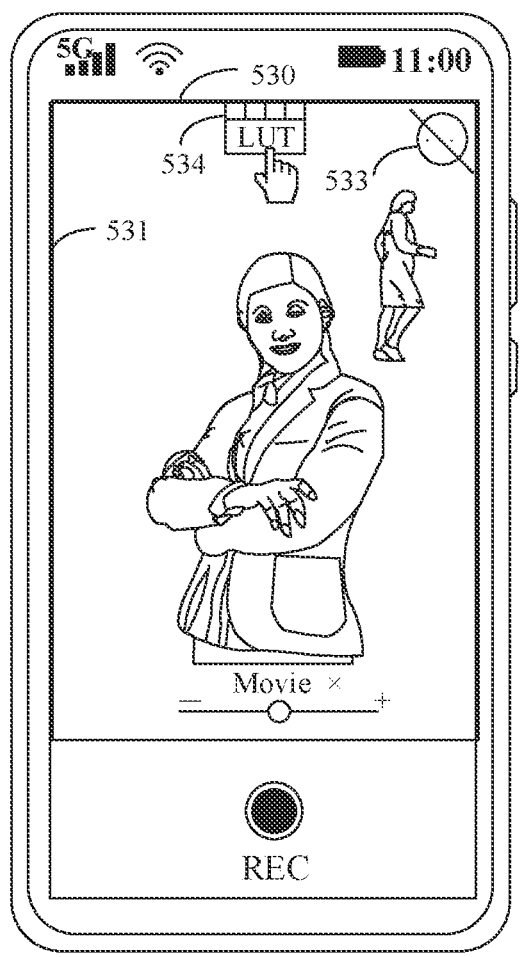
FIG. 22 is a schematic diagram of a display screen of an electronic device according to an embodiment of this application.
Figure 23:
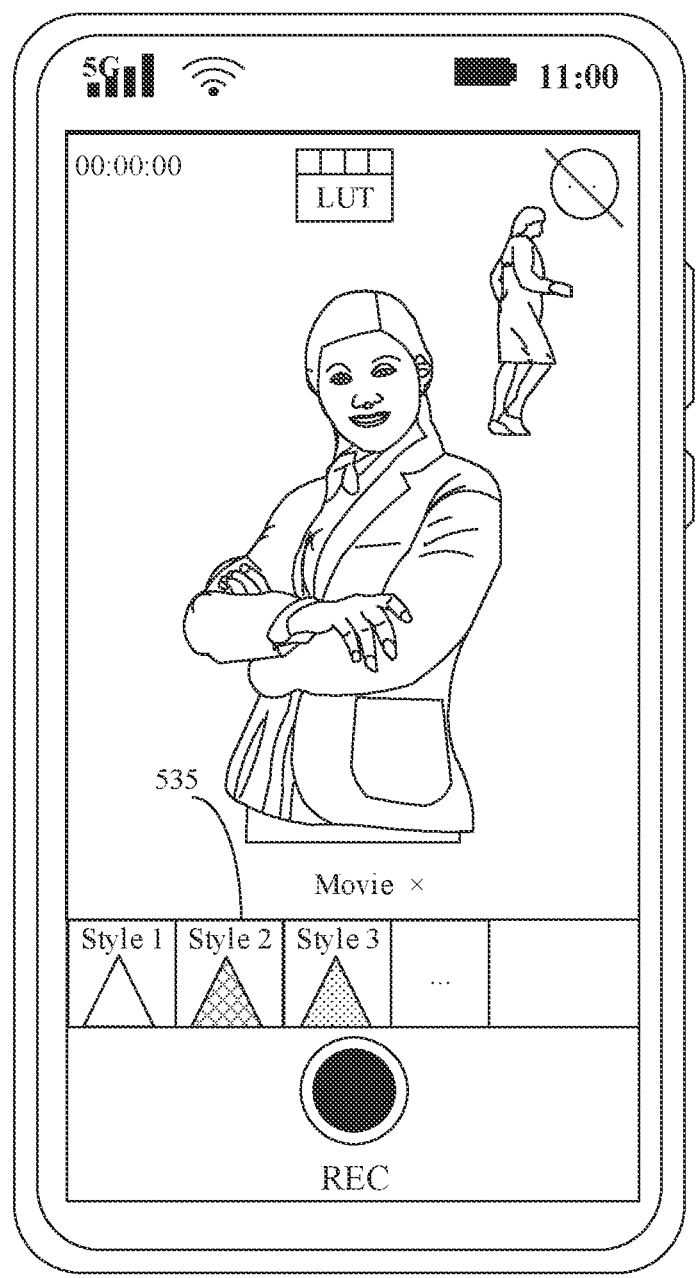
FIG. 23 is a schematic diagram of a display screen of an electronic device according to an embodiment of this application.
Figure 24:
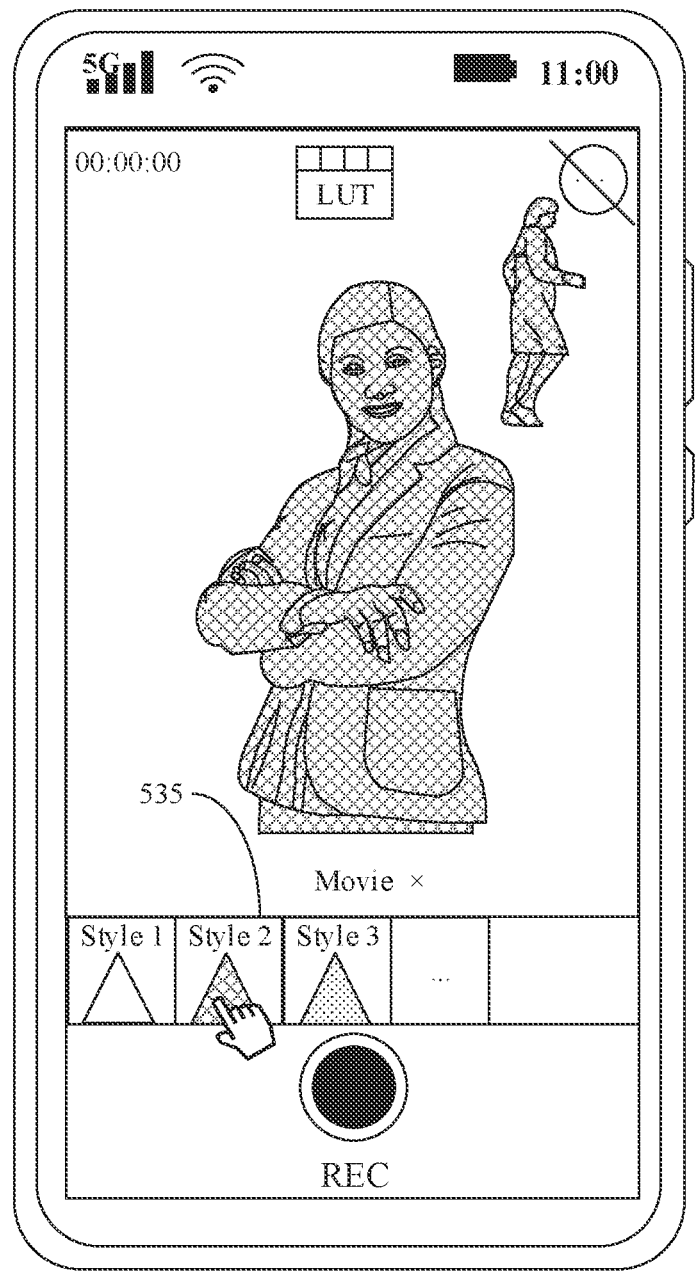
FIG. 24 is a schematic diagram of a display screen of an electronic device according to an embodiment of this application.

As shown in FIG. 21, in the photo mode screen, the electronic device may detect a user's operation of tapping a movie mode, and the electronic device enters the movie mode in response to the user's operation. As shown in FIG. 22, in the movie mode, the shooting screen 530 also includes a slow motion mode option 533 and a LUT option 534. The slow motion mode option 533 is used to indicate on/off of the slow motion mode; as shown in FIG. 22, the slow motion mode is currently off. In a case that the slow motion mode is off, the LUT option 534 is used to indicate a three-dimensional lookup table; in a case that the slow motion mode is on, the LUT option is used to indicate a two-dimensional lookup table. After the electronic device detects that the user taps the LUT option 534, the shooting screen may display a preview frame 535 with a plurality of different image styles. As shown in FIG. 23, the preview frame 535 may include style 1, style 2, style 3, and other image styles, and the image styles may include but are not limited to images styles, such as green and orange, warm sunshine, glow, and cyberpunk.

It should be understood that FIG. 23 may be a shooting screen in a movie mode when the electronic device is in a portrait mode. Based on a state of using the electronic device by the user, the electronic device may determine to display in a portrait or landscape mode.

Figure 25:
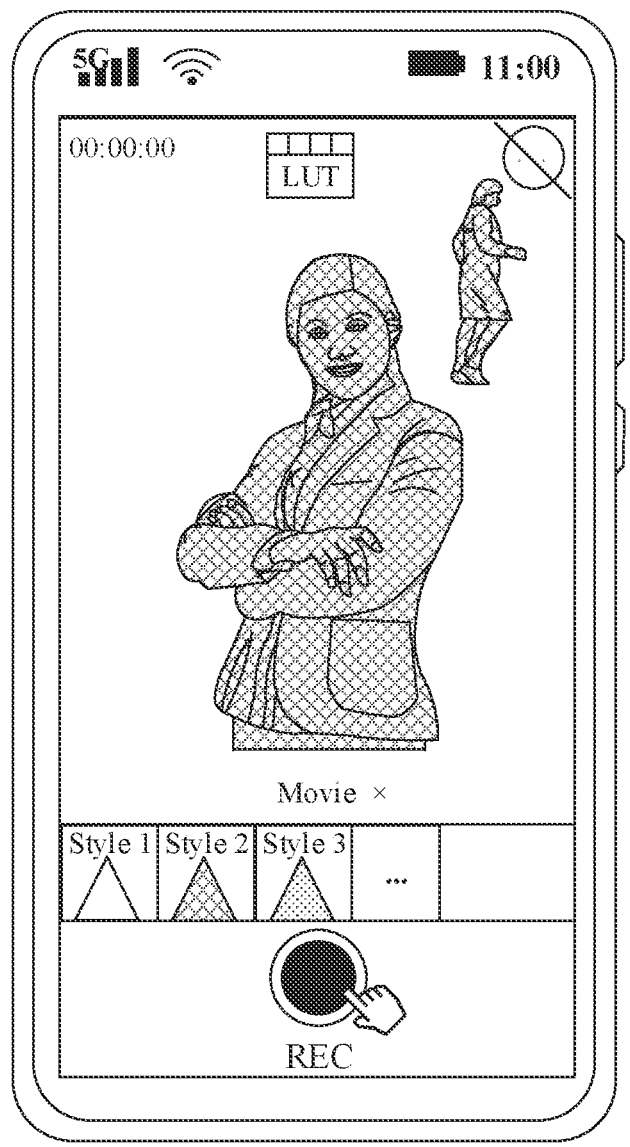
FIG. 25 is a schematic diagram of a display screen of an electronic device according to an embodiment of this application.

It should be further understood that the image styles displayed in the preview frame 535 in FIG. 23 are described as examples, the preview frame may also include other image styles, which is not limited in this application. In an example, using a shooting screen shown in FIG. 24 as an example, the electronic device detects that the user taps style 2 in the preview frame 535, and displays a preview image of style 2 in the viewfinder frame. Similarly, the user may alternatively tap an image style of another image pattern in the preview frame 535 for preview. After the user selects a target image style, a preview image corresponding to the target image style is displayed in the viewfinder frame. As shown in FIG. 25, after the user determines the target image style, the electronic device detects that the user taps a control indicating video recording. In response to the user's operation, the electronic device starts video recording, that is, the electronic device enters video shooting.

Figure 26:
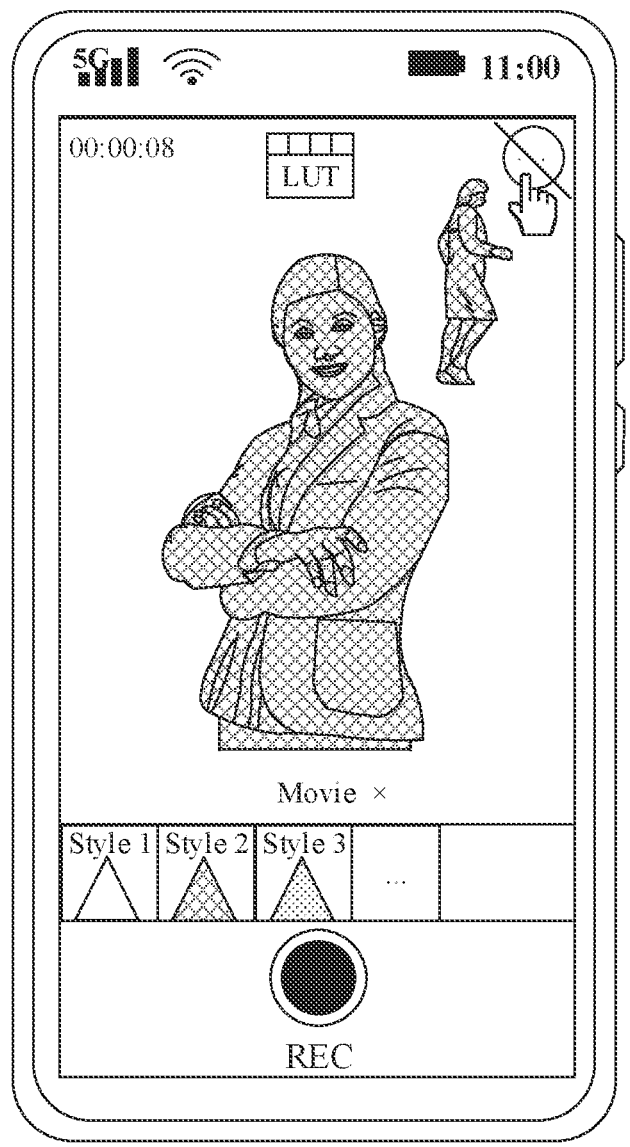
FIG. 26 is a schematic diagram of a display screen of an electronic device according to an embodiment of this application.
Figure 27:
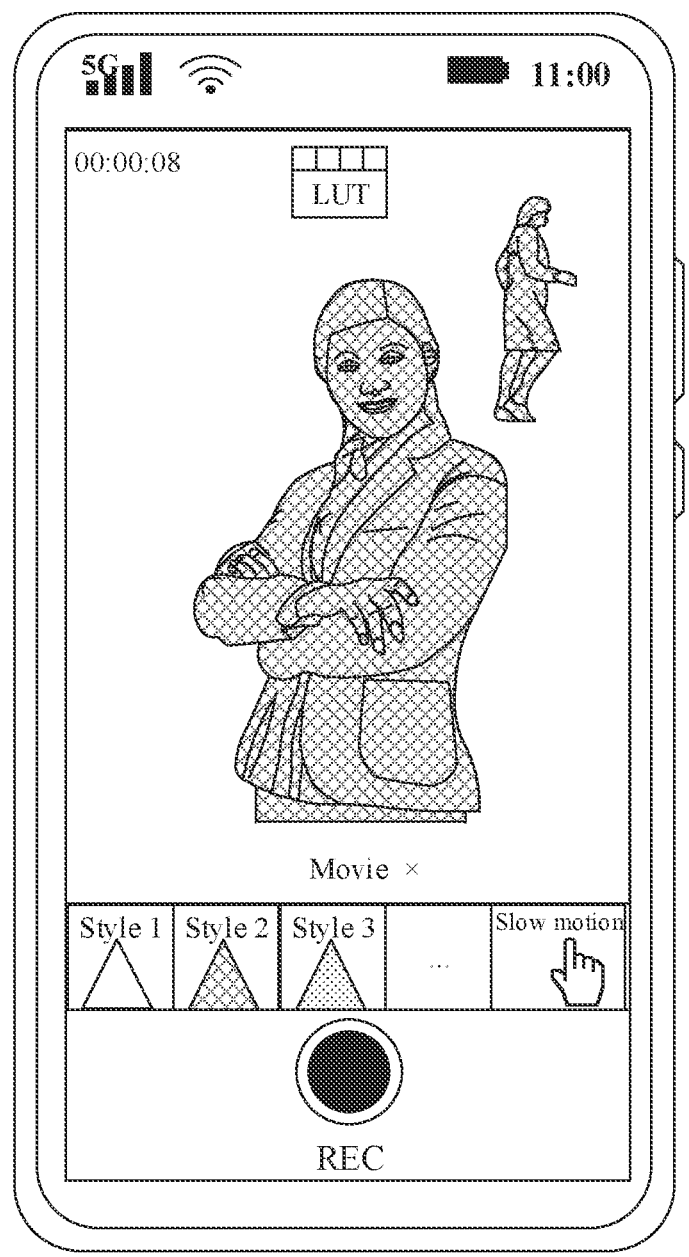
FIG. 27 is a schematic diagram of a display screen of an electronic device according to an embodiment of this application.
Figure 28:
FIG. 28 is a schematic diagram of a display screen of an electronic device according to an embodiment of this application.

As shown in FIG. 26, in the process of video recording, assuming that the slow motion mode is currently off at the 8th second of video shooting, the electronic device detects that the user taps the slow motion mode option. When the user taps the slow motion mode option, the slow motion mode of the camera is enabled and a reminder box displaying "slow motion on" is displayed on the display screen, and a few seconds later, the reminder box disappears automatically. At that time, the camera switches from the movie mode to the slow motion mode, as shown in FIG. 28; or a slow motion option may be included in the preview frame, as shown in FIG. 27. The electronic device detects that the user taps the slow motion option; and in response to the user's operation, the electronic device switches the camera from the movie mode to the slow motion mode, and displays a slow motion display screen, as shown in FIG. 28. On the slow motion display screen, the electronic device detects a user's operation on a control for indicating video recording, and the electronic device continues to shoot the video.

It should be noted that when the electronic device detects that the user taps the slow motion option, the electronic device may switch a three-dimensional lookup table in the movie mode to a two-dimensional lookup table; in other words, after the user taps the slow motion option, the electronic device performs color correction processing on images in the video by using the two-dimensional lookup table and a lookup table corresponding to style 2 in the three-dimensional lookup table.

It should be understood that the user's operation for indicating a video recording behavior may include tapping the record control by the user, or may include indicating the electronic device by the user by voice to perform a video recording behavior, or may include indicating the electronic device by the user using another instruction to perform a video recording behavior. The foregoing provides descriptions by using examples, which do not constitute any limitation on this application.

Application scenario 3: A to-be-processed video that has been shot completely is obtained, and 2D LUT processing is performed on the to-be-processed video, to obtain a processed target video.

In an example, the method for determining a two-dimensional lookup table provided in this embodiment of this application may be applied to image processing. After a shot video is obtained, color correction may be performed on the shot video based on the 2D LUT, to obtain a target video matching an image style required by the user.

Figure 29:
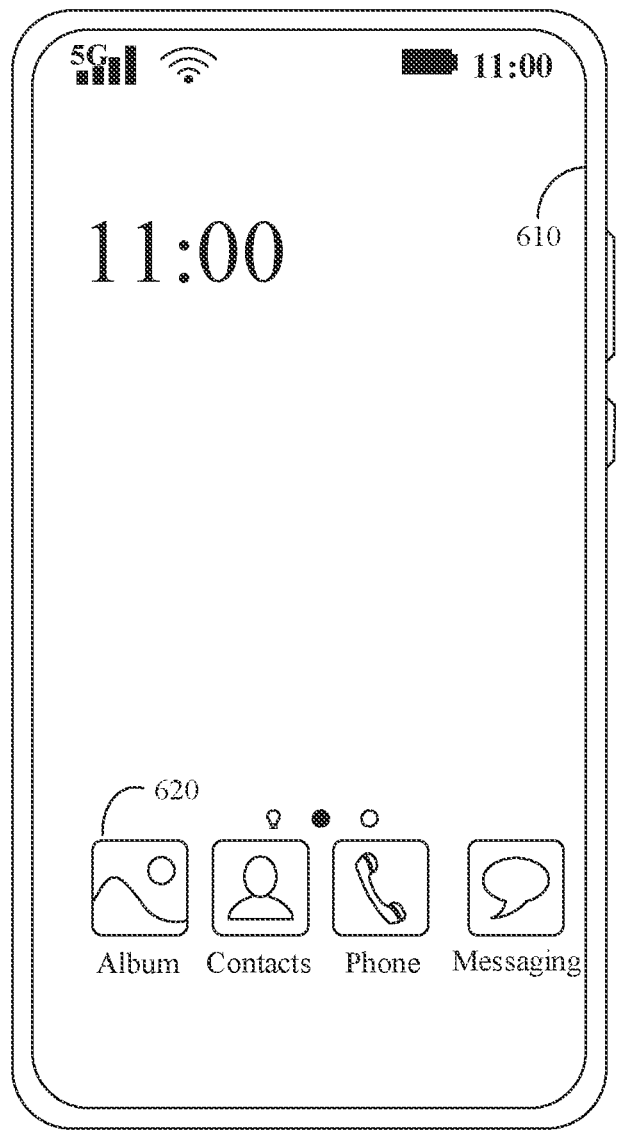
FIG. 29 is a schematic diagram of a display screen of an electronic device according to an embodiment of this application.
Figure 30:
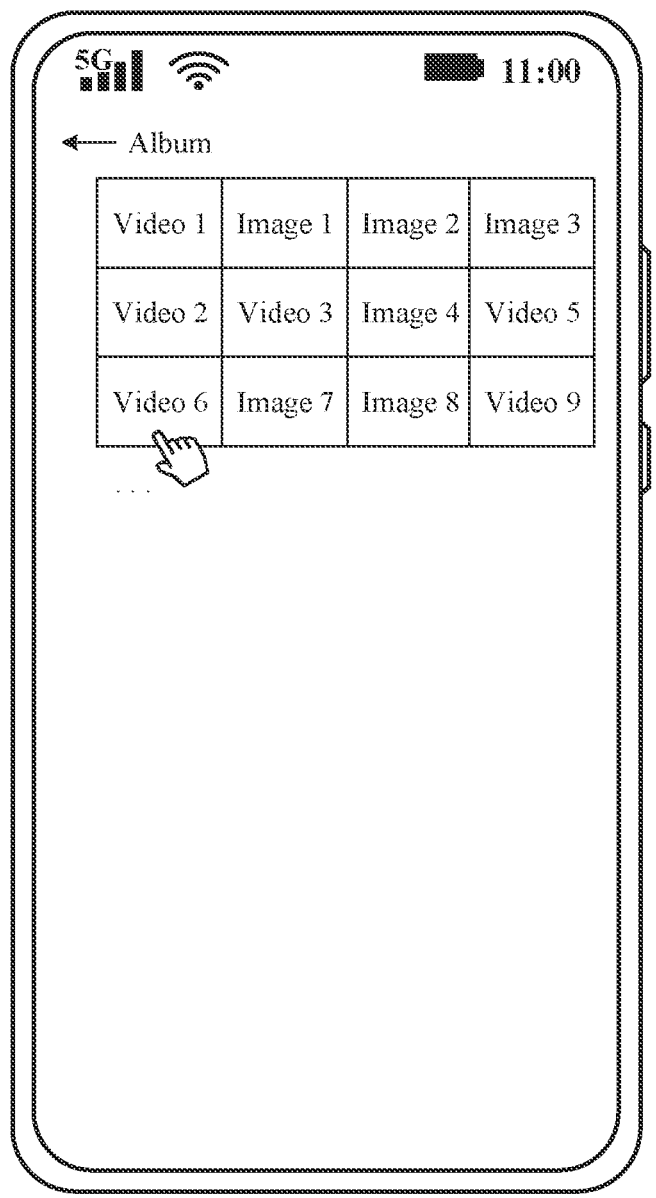
FIG. 30 is a schematic diagram of a display screen of an electronic device according to an embodiment of this application.
Figure 31:
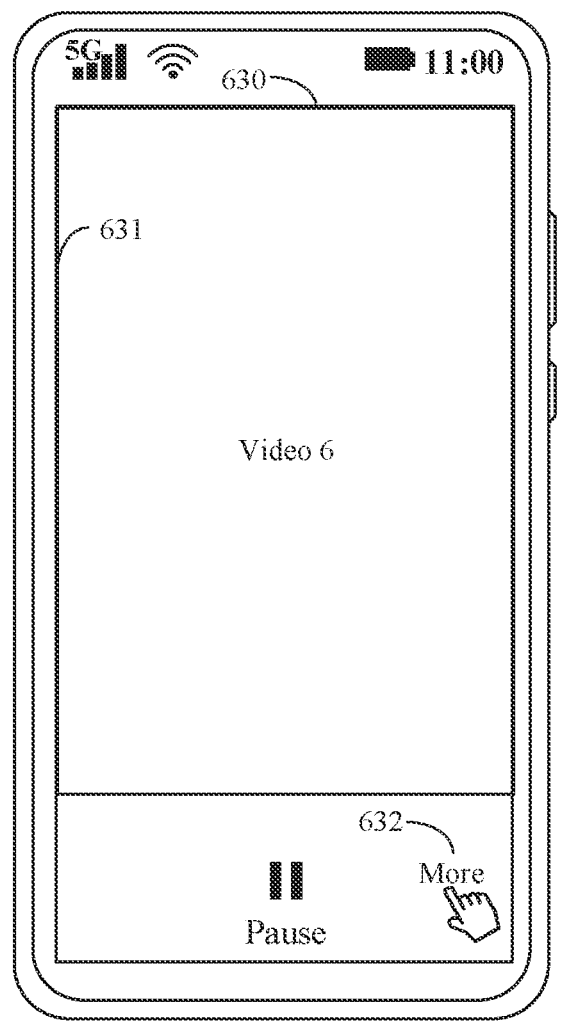
FIG. 31 is a schematic diagram of a display screen of an electronic device according to an embodiment of this application.
Figure 32:
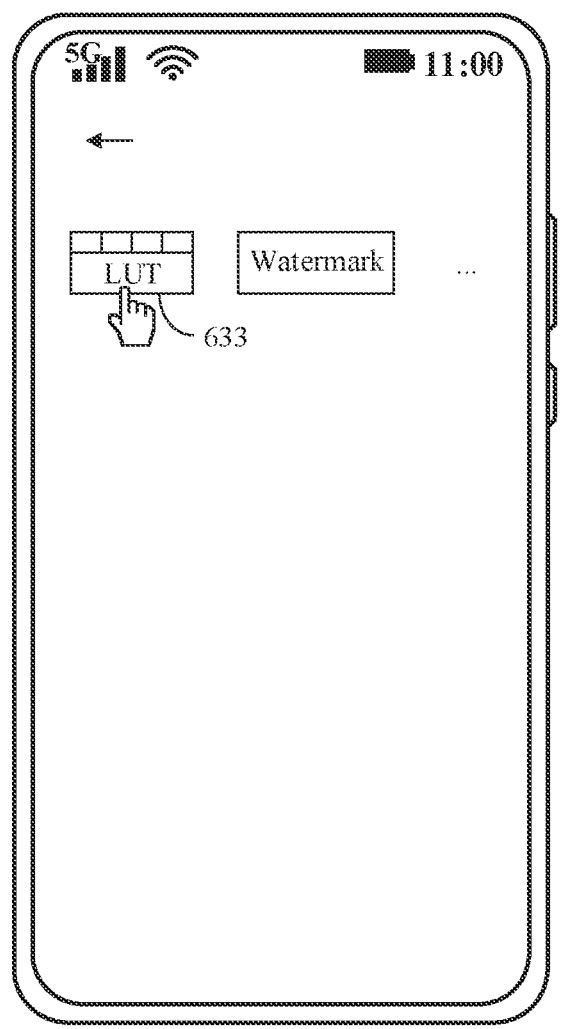
FIG. 32 is a schematic diagram of a display screen of an electronic device according to an embodiment of this application.

For example, FIG. 29 is a schematic diagram of a display home screen 610 of an electronic device. After the electronic device detects a user's operation of tapping an icon 620 of an album application on a home screen 610, the album application may be started and another GUI shown in FIG. 30 is displayed. FIG. 30 shows an album of the electronic device. The album includes videos and images. The electronic device detects a user's operation of tapping a video 6 in the album, and displays the video 6 on the display screen of the electronic device in response to the user's operation, as shown in FIG. 31. The display screen 630 shown in FIG. 31 includes a viewfinder frame 631, and content of the video 6 is displayed in the viewfinder frame 631. The shooting screen 630 further includes a more option 632. When detecting a user's operation of tapping the more option 632, the electronic device displays a setting screen of the more option in response to the user's operation, as shown in FIG. 32. The setting screen of the more option includes an LUT option 633, a watermark option, and other options. After detecting a user's operation of tapping the LUT option, the electronic device displays a display screen shown in FIG. 33. A preview frame 634 including a plurality of different image styles is displayed on the display screen 630, and the preview frame 634 may include style 1, style 2, style 3, and other image styles. The image styles may include but are not limited to images styles, such as green and orange, warm sunshine, glow, and cyberpunk.

Figure 34:
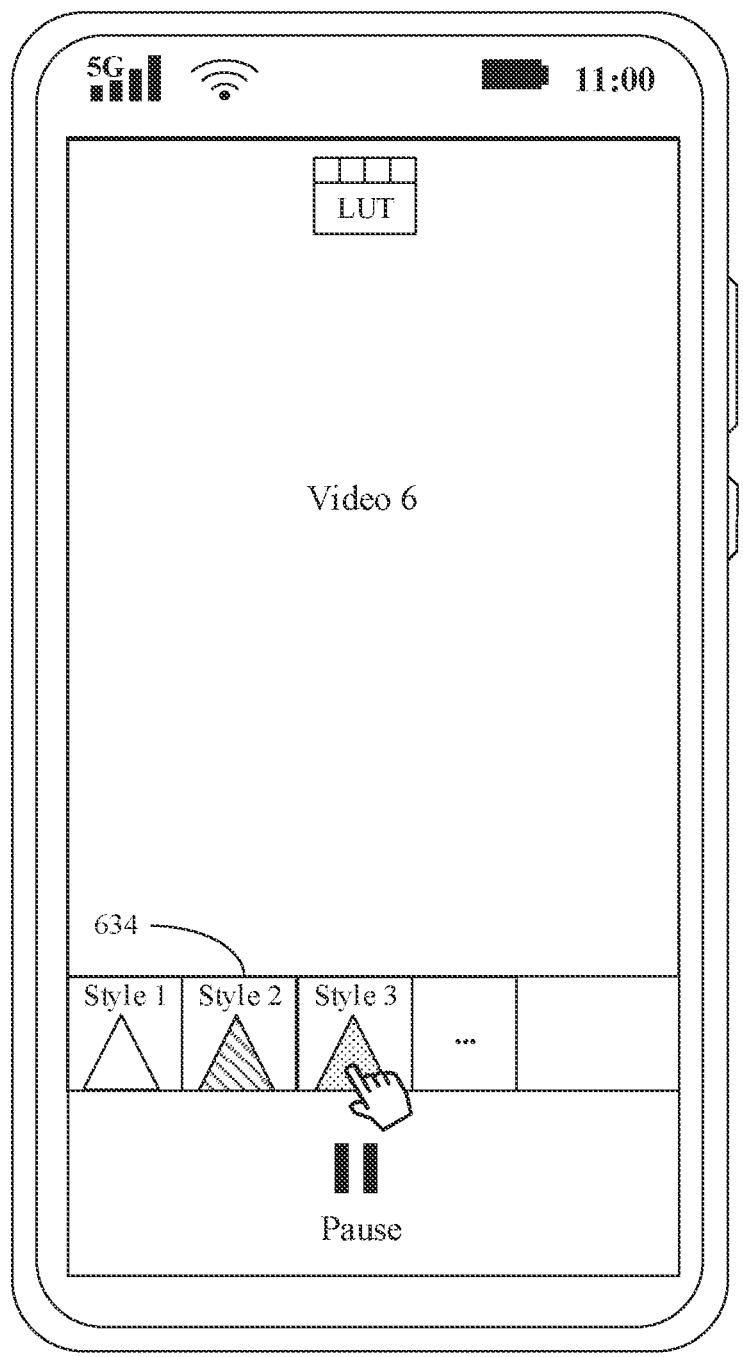
FIG. 34 is a schematic diagram of a display screen of an electronic device according to an embodiment of this application.

In an example, as shown in FIG. 34, the electronic device detects that the user taps style 3 in the preview frame 634, and the electronic device performs color correction processing on the video 6 based on style 3.

Figure 33:
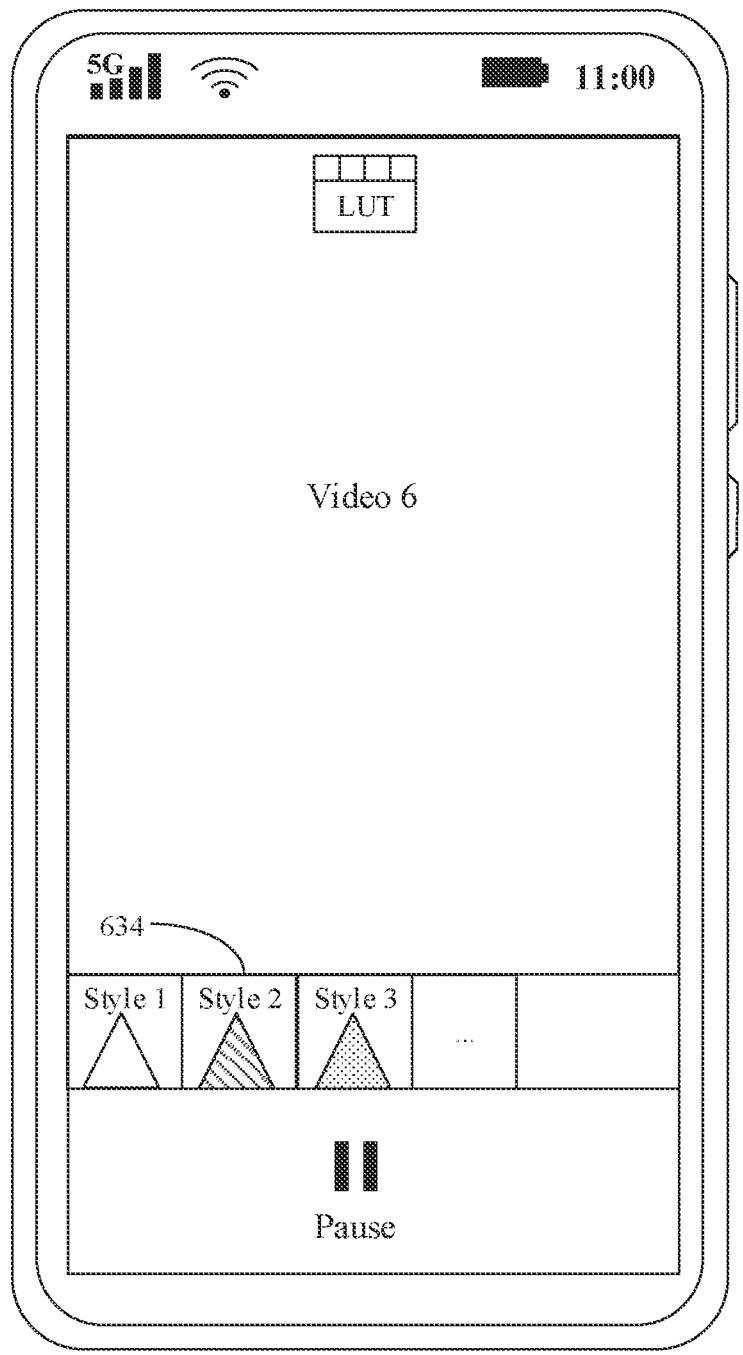
FIG. 33 is a schematic diagram of a display screen of an electronic device according to an embodiment of this application.

It should be understood that the LUT shown in FIG. 33 is a two-dimensional lookup table, and different images styles displayed in the preview frame 634 are different image styles (filter effects) corresponding to the two-dimensional lookup table.

Application scenario 4: 2D LUT processing is performed on a to-be-processed video that has been shot completely in an image processing application to obtain a processed target video.

In an example, the method for determining a two-dimensional lookup table provided in this embodiment of this application may be applied to image processing. After a shot video is obtained, color correction may be performed on the shot video based on the 2D LUT in the image processing APP, to obtain a target video matching an image style required by the user.

Figure 35:
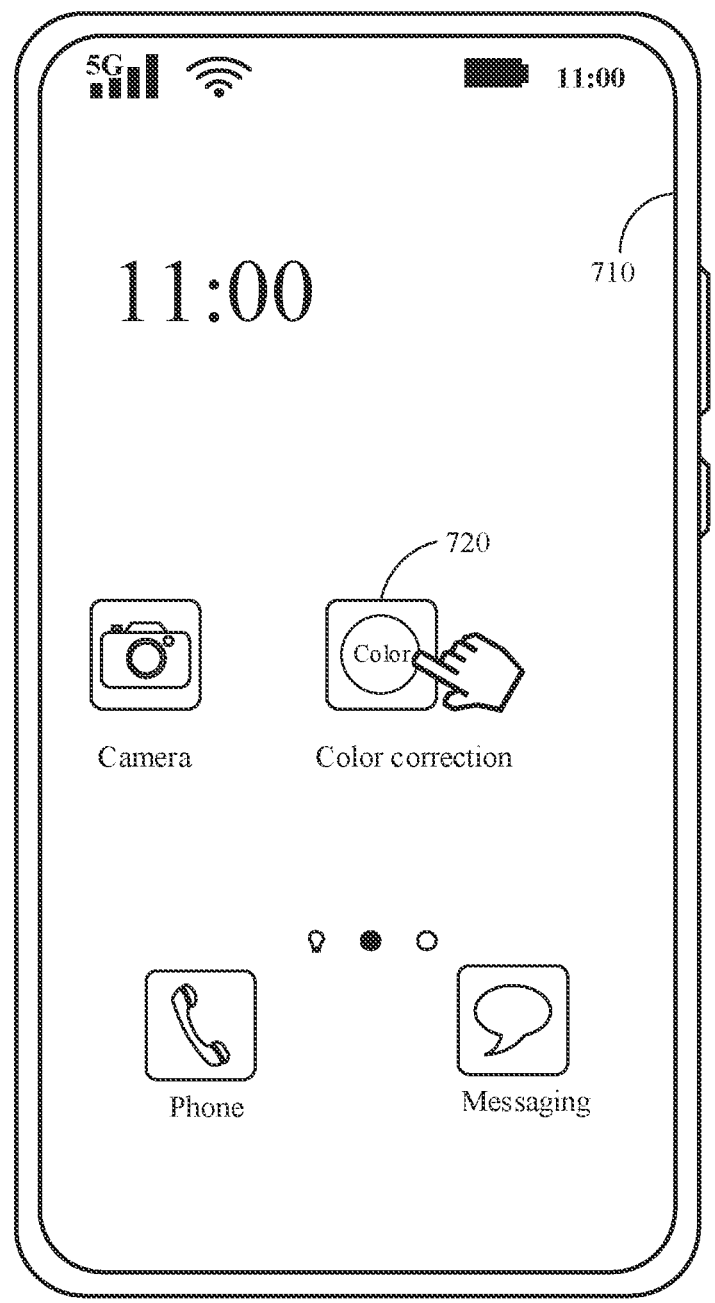
FIG. 35 is a schematic diagram of a display screen of an electronic device according to an embodiment of this application.
Figure 36:
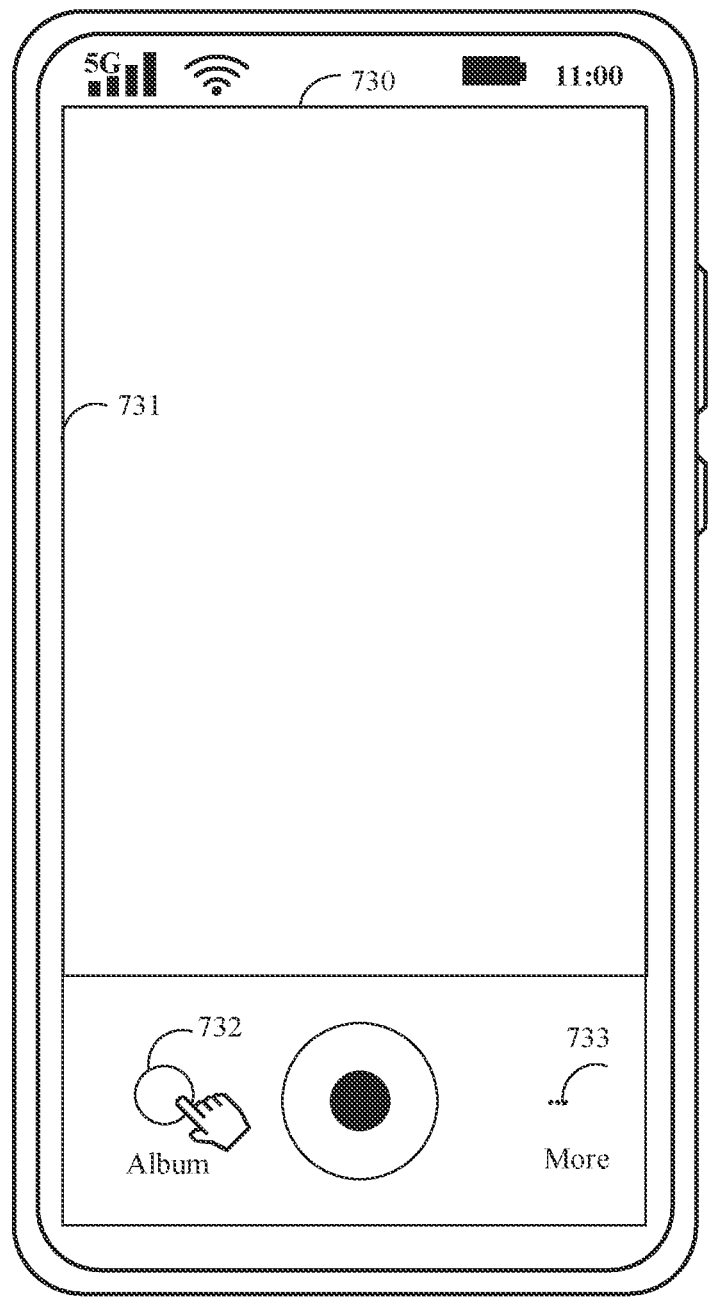
FIG. 36 is a schematic diagram of a display screen of an electronic device according to an embodiment of this application.
Figure 37:
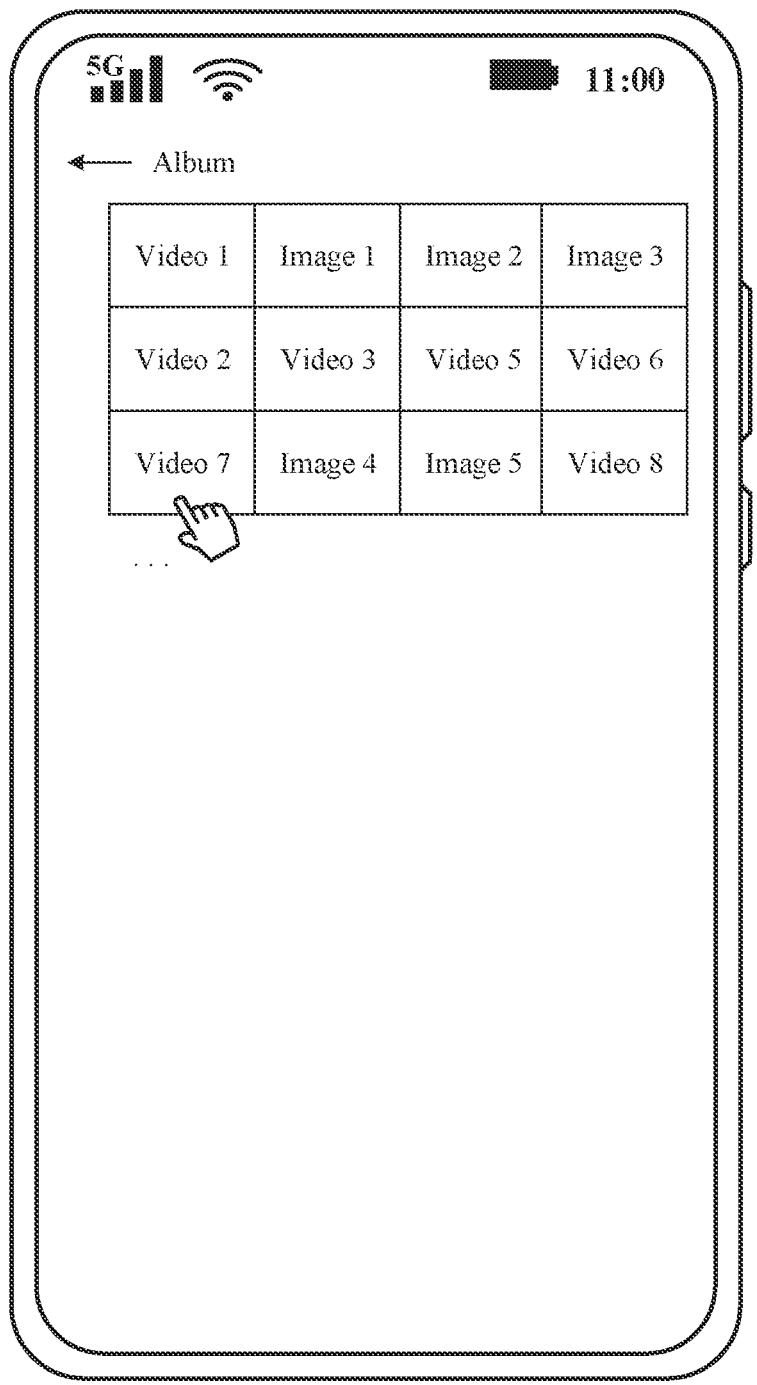
FIG. 37 is a schematic diagram of a display screen of an electronic device according to an embodiment of this application.
Figure 38:
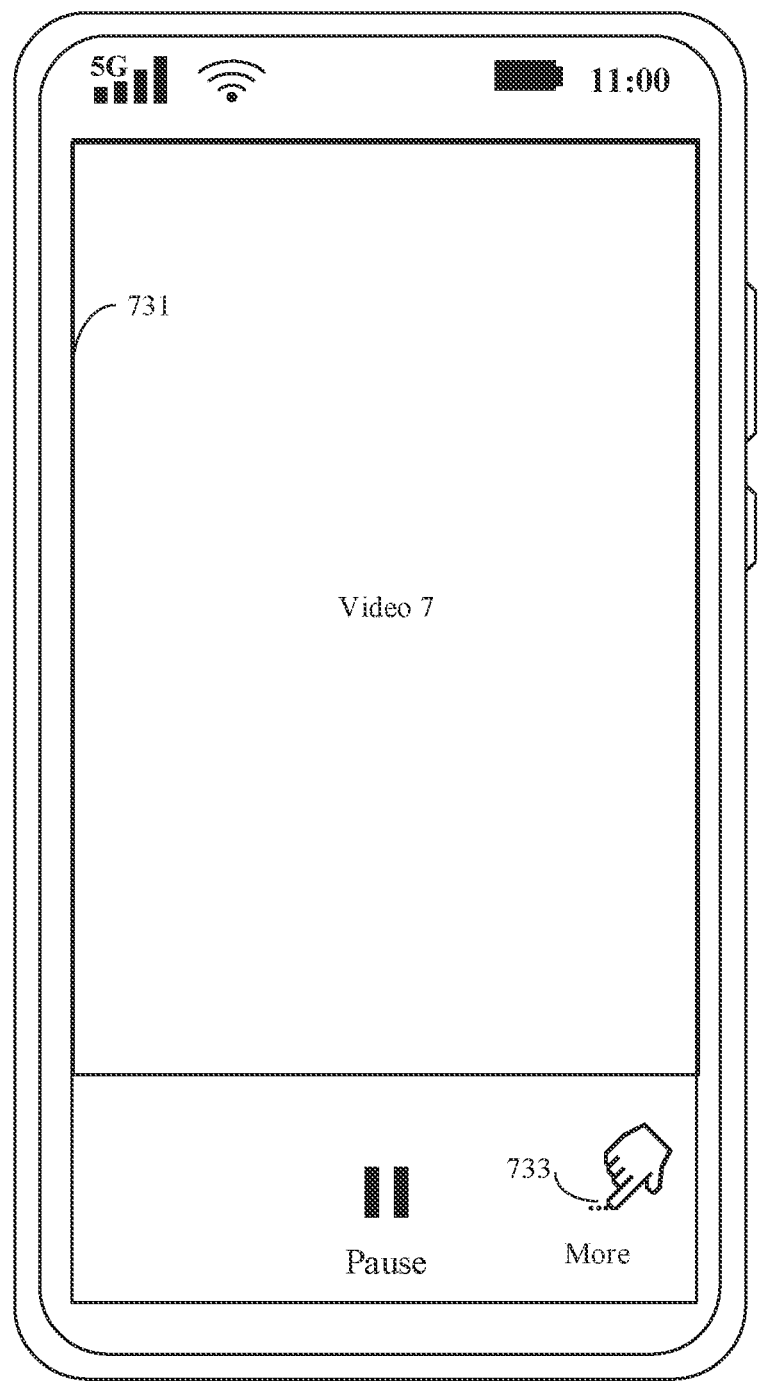
FIG. 38 is a schematic diagram of a display screen of an electronic device according to an embodiment of this application.
Figure 39:
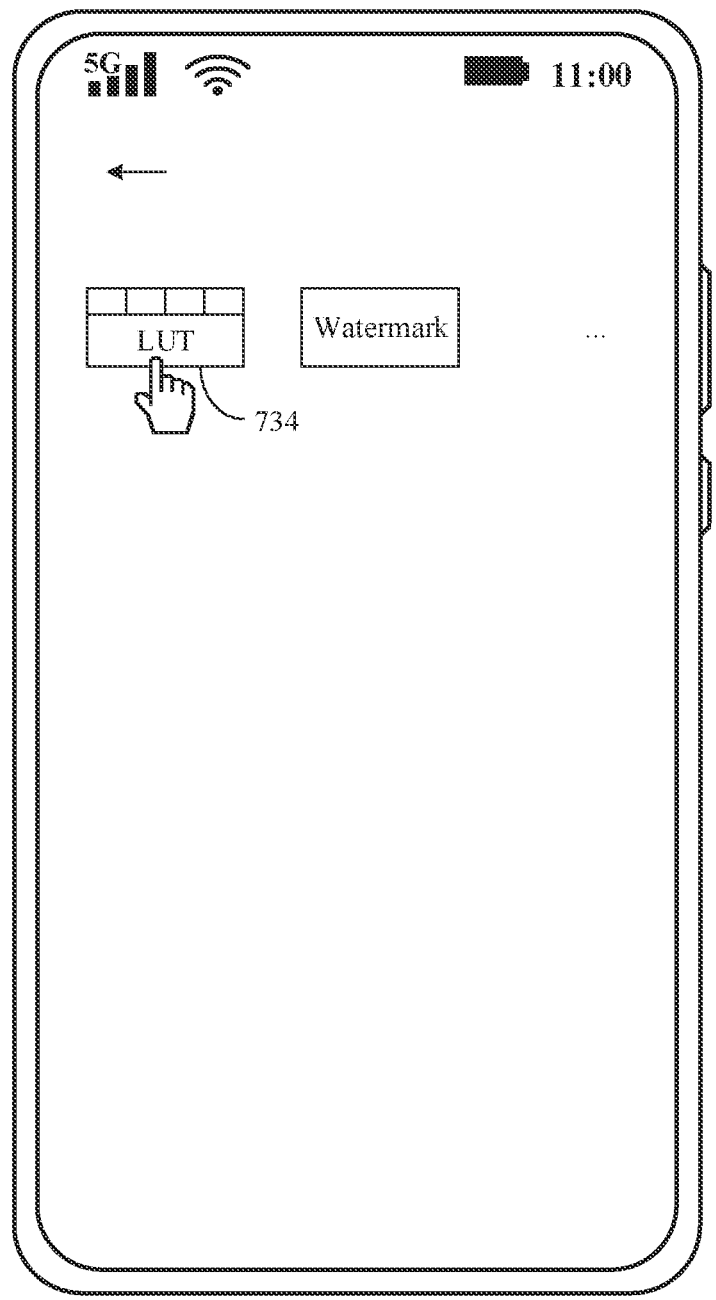
FIG. 39 is a schematic diagram of a display screen of an electronic device according to an embodiment of this application.
Figure 40:
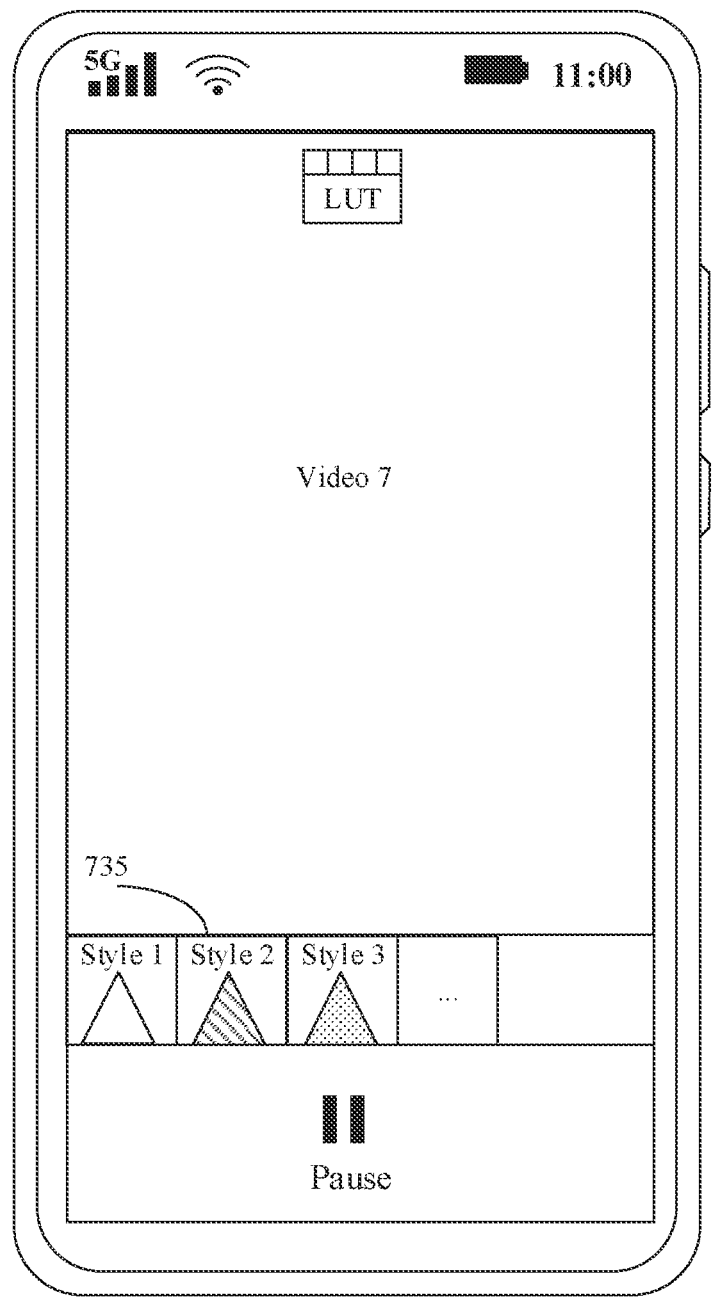
FIG. 40 is a schematic diagram of a display screen of an electronic device according to an embodiment of this application.

For example, FIG. 35 is a schematic diagram of a display home screen 710 of the electronic device. After the electronic device detects a user's operation of tapping an icon 720 of a color correction application on the home screen 710, the color correction application may be started, and another GUI shown in FIG. 36 is displayed. The GUI shown in FIG. 36 may be a display screen of the color correction application, and the GUI may include a display screen 730. The display screen 730 may include a viewfinder frame 731 and controls, for example, the display screen 730 may include an album 732 and a more option 733. The electronic device detects a user's operation of tapping the album 732, and displays the album in response to the user's operation, displaying a display screen shown in FIG. 37. The album includes videos and images. The electronic device detects a user's operation of tapping a video 7 in the album, and displays the video 7 on the display screen of the electronic device in response to the user's operation, and a display screen shown in FIG. 38 is displayed. The electronic device detects a user's operation of tapping a more option 733, and in response to the user's operation, the electronic device displays a setting screen for the more option, and a display screen shown in FIG. 39 is displayed. The setting screen of the more option includes an LUT option 734, a watermark option, and other options. After detecting a user's operation of tapping the LUT option 734, the electronic device displays a display screen shown in FIG. 40. As shown in FIG. 40, a preview frame 735 including a plurality of different image styles is displayed on the display screen, and the preview frame 735 may include style 1, style 2, style 3, and other image styles. The image styles may include but are not limited to images styles, such as green and orange, warm sunshine, glow, and cyberpunk.

Figure 41:
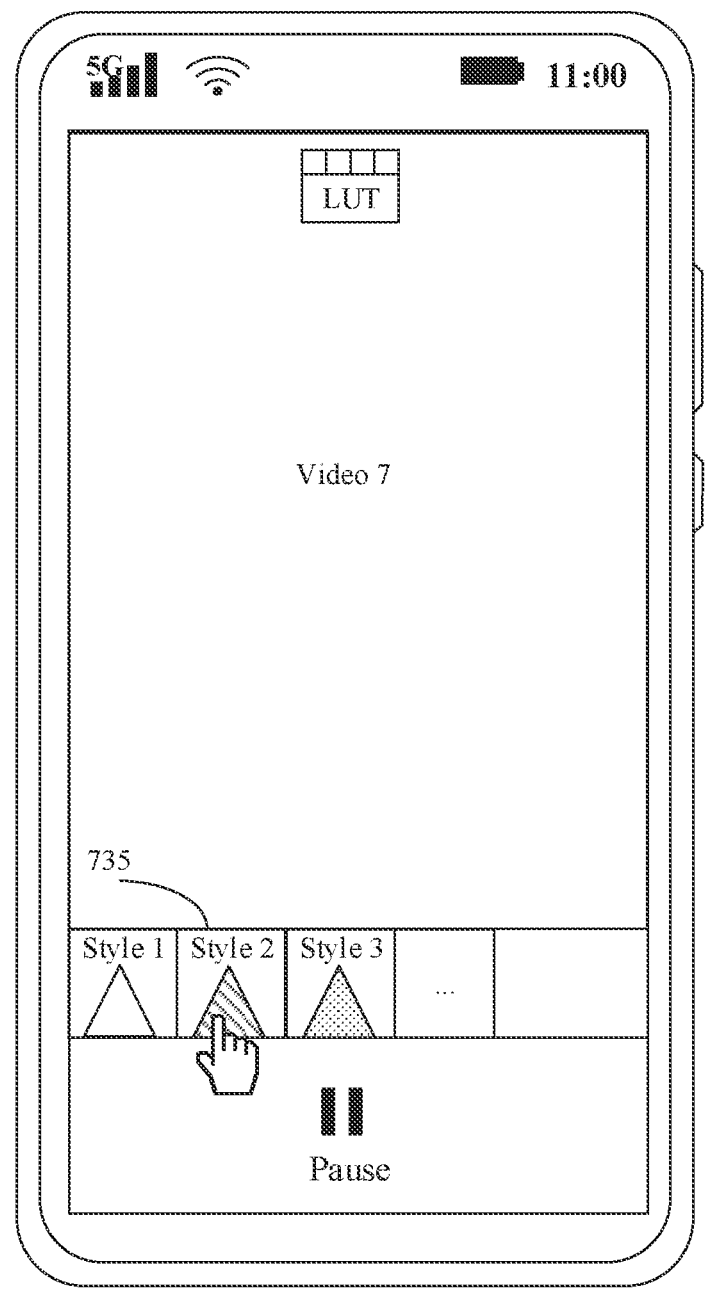
FIG. 41 is a schematic diagram of a display screen of an electronic device according to an embodiment of this application.

In an example, as shown in FIG. 41, the electronic device detects that the user taps style 2 in the preview frame 735, and the electronic device performs color correction processing on the video 7 based on style 2.

It should be understood that the LUT shown in FIG. 40 is a two-dimensional lookup table, and different images styles displayed in the preview frame 735 are different image styles (filter effects) corresponding to the two-dimensional lookup table.

Figure 42:
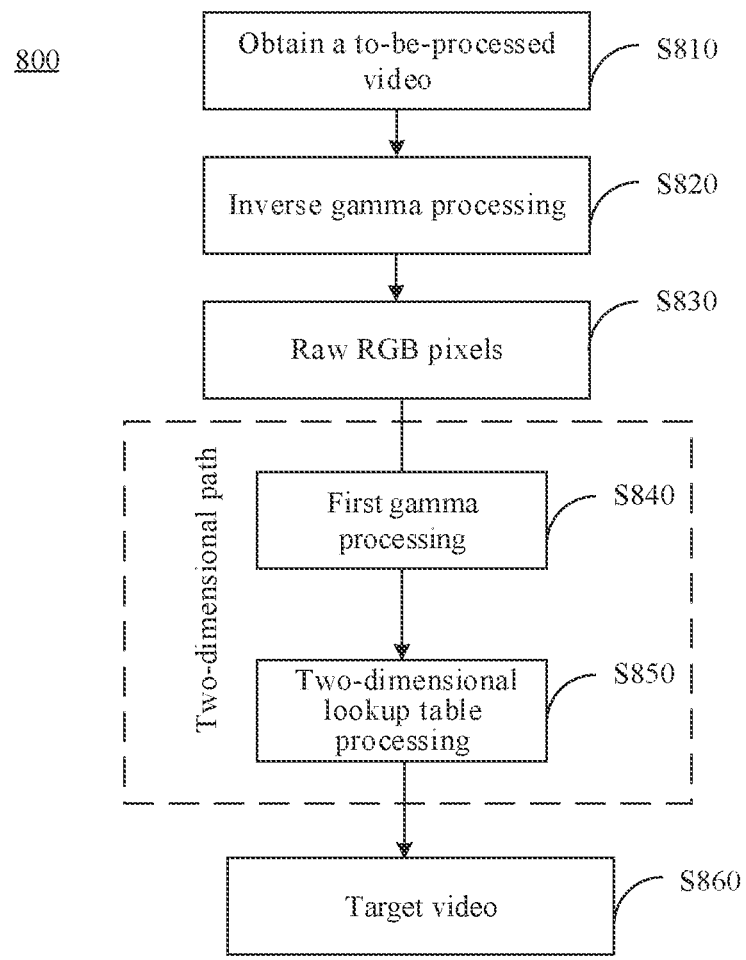
FIG. 42 is a schematic diagram of an image processing method according to an embodiment of this application.

The foregoing describes graphics display screens of the electronic device on which the user operates with reference to FIG. 29 to FIG. 41, and the following describes an image processing algorithm run by the electronic device with reference to FIG. 42.

FIG. 42 is a schematic flowchart of an image processing method according to an embodiment of this application. The method 800 includes step S810 to step S860, and the following describes in detail the steps.

It should be understood that when FIG. 18 and FIG. 19 are used for real-time shooting of an image or a video, color correction is performed on the image. The method shown in FIG. 42 is used to obtain images or videos that have been shot completely and to perform color correction processing on the shot images or videos.

Step S810: Obtain a to-be-processed video.

For example, the to-be-processed video may be a video requiring color correction, and the to-be-processed video may be a video obtained internally from the electronic device (for example, a video stored in the album of the electronic device or an RGB video obtained by the electronic device from cloud). When the to-be-processed video is a video in another format, the to-be-processed video needs to be converted into an RGB video.

Step S820: Perform inverse gamma processing.

It should be noted that the to-be-processed video is a video that has been shot completely, and if color correction processing needs to be performed on the to-be-processed video, an original RGB image, for example, raw RGB pixels that are output in color correction matrix 208 in FIG. 16, corresponding to each frame of image in the to-be-processed video needs to be obtained.

Step S830: Obtain raw RGB pixels.

It should be understood that the raw RGB pixels may be RGB pixels that have not been gamma processed.

Step S840: Perform first gamma processing on the raw RGB pixels.

For example, first gamma processing is performed on the to-be-processed RGB image based on three curves obtained through fitting in step 4 of FIG. 17, where the three curves are gamma curves corresponding to the three channels of r, g, and b.

Further, an image obtained through first gamma processing may be converted from an RGB color space to an HSL color space.

Step S850: Perform two-dimensional lookup table processing.

For example, an adjustment amount may be obtained based on the two-dimensional lookup table, to obtain a color-corrected image.

It should be noted that different two-dimensional lookup tables may correspond to different image styles; the user may select an image style for color correction for the images in the to-be-processed video based on requirements, so that the electronic device determines a two-dimensional lookup table corresponding to the image style, and performs color correction on the images in the to-be-processed video based on the two-dimensional lookup table.

In an example, for the HSL color space, a fixed L value may be used, and an after-correction H value and an after-correction S value may be obtained based on a two-dimensional lookup table corresponding to H and a two-dimensional lookup table corresponding to S, respectively. The after-correction H value may be obtained by adding a hue adjustment amount ΔH to an original H value; similarly, the after-correction S value may be obtained by adding a saturation adjustment amount ΔS to an original S value. The original H value and the original S value are an original H value and an original S value that are respectively obtained after raw RGB pixels are converted into the HSL color space, and ΔH and ΔS are obtained through a two-dimensional lookup table.

Step S860: Obtain a target video.

For example, an HSL image obtained through two-dimensional lookup table processing in step S850 is converted to an RGB color space, to obtain the target video.

It should be understood that the target video may be a video with a user-desired image effect obtained based on a two-dimensional lookup table selected by the user.

It should be further understood that the description is provided by using a video as an example; similarly, what is obtained may alternatively be a to-be-processed image, and processing described above may be performed on the to-be-processed image, to obtain a target image.

In this embodiment of this application, a two-dimensional lookup table is created based on a three-dimensional lookup table; image processing is performed on the original image frame based on the two-dimensional lookup table to obtain the target image frame, so that the resulting target image frame can have the same or similar image quality as an image obtained through the three-dimensional lookup table. In this embodiment of this application, the two-dimensional lookup table is used to perform image processing on the original image frame; therefore, image quality can be ensured and computation load of the electronic device can be reduced.

It should be noted that the foregoing example is intended to help a person skilled in the art understand the embodiments of this application, but not to limit the embodiments of this application to specific values or a specific scenarios in the examples. A person skilled in the art may apparently perform various equivalent modifications or variations based on descriptions of the foregoing example, and such modifications or variations shall also fall within the scope of the embodiments of this application.

Figure 43:
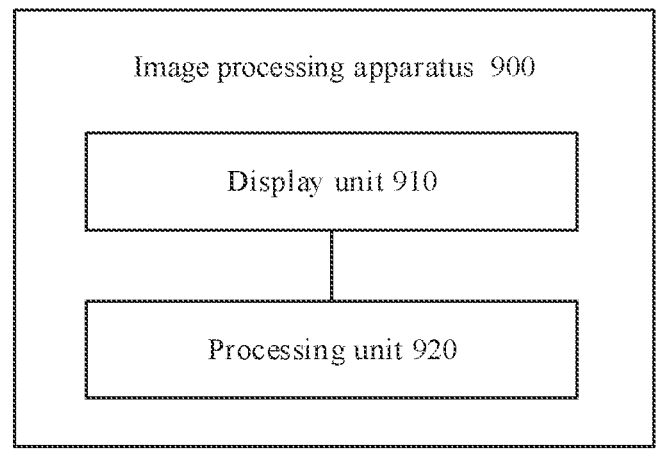
FIG. 43 is a schematic diagram of an image processing apparatus according to an embodiment of this application.
Figure 44:
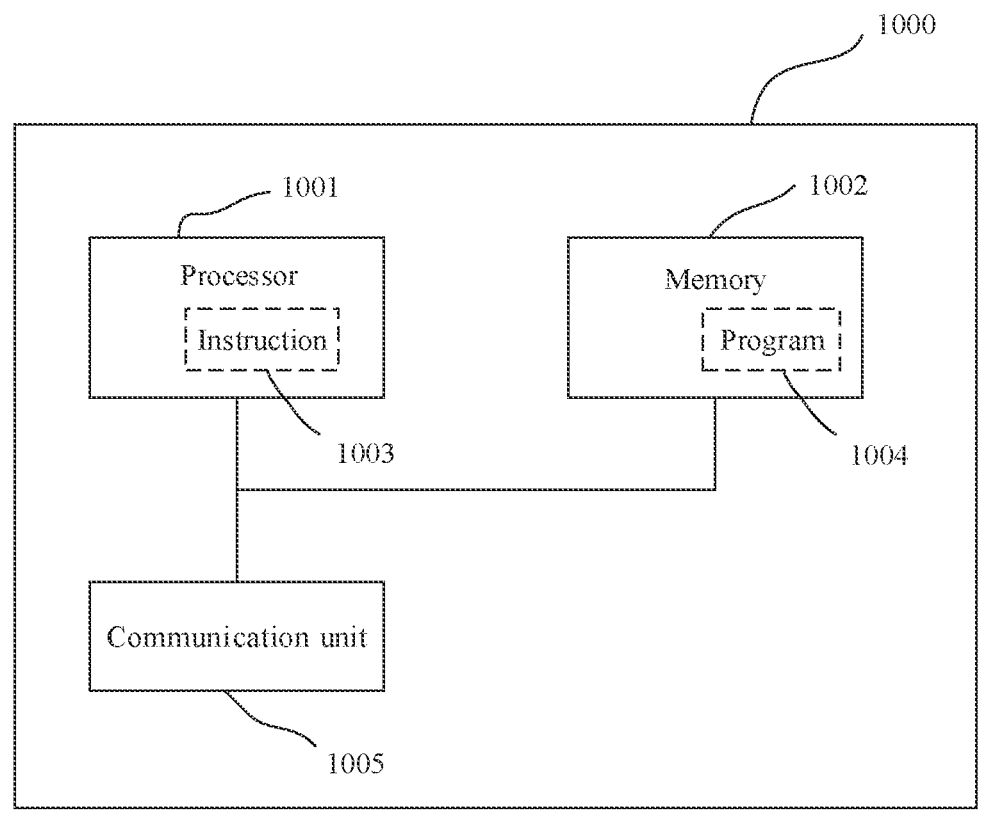
FIG. 44 is a schematic diagram of an electronic device according to an embodiment of this application.

The foregoing has described in detail the image processing method in the embodiments of this application with reference to FIG. 1 to FIG. 42, and the following describes in detail the apparatus embodiments of this application with reference to FIG. 43 and FIG. 44. It should be understood that the image processing apparatus in the embodiments of the present invention can perform the image processing methods in the foregoing embodiments of the present invention. For specific working processes of the products, refer to corresponding processes in the foregoing method embodiments.

FIG. 43 is a schematic structural diagram of an image processing apparatus according to an embodiment of this application. The image processing apparatus 900 includes a display unit 910 and a processing unit 920.

The display unit 910 is configured to display a first screen in a first shooting mode, where the first screen includes a first control. The processing unit 920 is configured to detect a first operation on the first control; in response to the first operation, determine a first mapping in gamma processing and a second mapping in a two-dimensional lookup table, where the first mapping corresponds to the first control, the second mapping corresponds to the first control, and the first mapping is associated with the second mapping; obtain a to-be-processed image; and process the to-be-processed image based on the first mapping and the second mapping to obtain a first image.

With reference to the second aspect, in some implementations of the second aspect, the processing unit 920 is specifically configured to:

process the to-be-processed image based on the first mapping to obtain a second image;

determine a first adjustment amount and a second adjustment amount based on the second image and the second mapping, where the first adjustment amount is used to indicate an adjustment amount of a first color component in the second image, and the second adjustment amount is used to indicate an adjustment amount of a second color component in the second image; and obtain the first image based on the second image, the first adjustment amount, and the second adjustment amount.

Optionally, in an embodiment, the first mapping being associated with the second mapping is used to indicate that the second mapping in the two-dimensional lookup table is determined based on the first mapping in the gamma processing.

Optionally, in an embodiment, the processing unit 920 is specifically configured to:

obtain a third mapping in the gamma processing and a fourth mapping in a three-dimensional lookup table, where the fourth mapping in the three-dimensional lookup table corresponds to the second mapping in the two-dimensional lookup table;

evenly divide a first color space to obtain an image in an initial first color space and an image in an initial second color space;

process the image in the initial second color space based on the first mapping of the gamma processing, the third mapping of the gamma processing, and the fourth mapping in the three-dimensional lookup table, to obtain a third image, where the third image is an image in the second color space;

convert the third image to a fourth image in the first color space; and determine the second mapping in the two-dimensional lookup table based on a pixel difference between the image in the initial first color space and the fourth image in the first color space.

Optionally, in an embodiment, the processing unit 920 is specifically configured to:

determine a first lightness value; and when lightness is the first lightness value, determine the second mapping in the two-dimensional lookup table based on the pixel difference between the image in the initial first color space and the fourth image in the first color space.

Optionally, in an embodiment, the first color space is an HSL color space or an HSV color space, and the second color space is an RGB color space.

Optionally, in an embodiment, the first shooting mode is a shooting mode in which a frame output rate of images is greater than a preset threshold.

Optionally, in an embodiment, the first control is a control for indicating the second mapping in the two-dimensional lookup table.

Optionally, in an embodiment, the first control is a control for indicating automatic identification of the second mapping in the two-dimensional lookup table.

It should be noted that the image processing apparatus 900 is embodied in a form of a functional unit. The term "unit" herein may be implemented in the form of software and/or hardware, which is not specifically limited.

For example, a "unit" may be a software program, a hardware circuit, or a combination of the two that implements the functions described above. The hardware circuit may include an application-specific integrated circuit (application specific integrated circuit, ASIC), an electronic circuit, a processor configured to execute one or more software or firmware programs (for example, a shared processor, a dedicated processor, or a group processor) and a memory, or a merged logic circuit and/or another appropriate component supporting the described functions.

Therefore, the units in the example described in the embodiments of this application can be implemented by electronic hardware, or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

FIG. 44 is a schematic structural diagram of an electronic device according to this application. A dashed line in FIG. 44 indicates that the unit or the module is optional. The electronic device 1000 may be used to implement the image processing method described in the foregoing method embodiments.

The electronic device 1000 includes one or more processors 1001, and the one or more processors 1001 can support the electronic device 1000 to implement the methods in the method embodiments. The processor 1001 may be a general purpose processor or a special purpose processor. For example, the processor 1001 may be a central processing unit (central processing unit, CPU), a digital signal processor (digital signal processor, DSP), an application specific integrated circuit (application specific integrated circuit, ASIC), a field programmable gate array (field programmable gate array, FPGA), or other programmable logic devices such as discrete gates, transistor logic devices, or discrete hardware components.

The processor 1001 may be configured to control the electronic device 1000, execute a software program, and process data of the software program. The electronic device 1000 may further include a communication unit 1005, to implement signal input (reception) and output (transmission).

For example, the electronic device 1000 may be a chip; the communication unit 1005 may be an input and/or output circuit of the chip, or the communication unit 1005 may be a communication interface of the chip; and the chip may be a component of a terminal device or other electronic devices.

For another example, the electronic device 1000 may be a terminal device, and the communication unit 1005 may be a transceiver of the terminal device, or the communication unit 1005 may be a transceiver circuit of the terminal device.

The electronic device 1000 may include one or more memories 1002 on which a program 1004 is stored. The program 1004 may be executed by the processor 1001 to generate an instruction 1003, so that the processor 1001 executes, according to the instruction 1003, the image processing method described in the foregoing method embodiments.

Optionally, data may be also stored in the memory 1002. Optionally, the processor 1001 may also read data stored in the memory 1002, the data may be stored in a same storage address as the program 1004, or the data may be stored at a different storage address from the program 1004.

The processor 1001 and the memory 1002 may be disposed separately or integrated together, for example, being integrated on a system on chip (system on chip, SOC) of a terminal device.

For example, the memory 1002 may be configured to store related programs 1004 of the image processing method provided in the embodiments of this application. The processor 1001 may be configured to invoke, during image processing, the related programs 1004 of the image processing method stored in the memory 1002, and execute the image processing method in the embodiments of this application, for example, displaying a first screen in a first shooting mode, where the first screen includes a first control; detecting a first operation on the first control; in response to the first operation, determining a first mapping in gamma processing and a second mapping in a two-dimensional lookup table, where the first mapping corresponds to the first control, the second mapping corresponds to the first control, and the first mapping is associated with the second mapping; obtaining a to-be-processed image; and processing the to-beprocessed image based on the first mapping and the second mapping to obtain a first image.

This application further provides a computer program product. When the computer program product is executed by the processor 1001, the image processing method according to any one of the foregoing method embodiments is implemented.

The computer program product may be stored in the memory 1002, and for example, is the program 1004. Through processing procedures such as preprocessing, compilation, assembly, and linking, the program 1004 is finally converted into an executable object file that can be executed by the processor 1001.

This application further provides a computer-readable medium, where a computer program is stored in the computer-readable medium. When the computer program is executed by a computer, the image processing method according to any one of the method embodiments in this application is implemented. The computer program may be a high-level language program or an executable object program.

Optionally, the computer-readable storage medium is, for example, a memory 1002. The memory 1002 may be a volatile memory or a non-volatile memory, or the memory 1002 may include both a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) and is used as an external cache. As exemplary rather than restrictive description, many forms of RAM can be used, such as a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDRSDRAM), an enhanced synchronous dynamic random access memory (enhanced SDRAM, ESDRAM), a synchronous link dynamic random access memory (synchlink DRAM, SLDRAM), and a direct Rambus random access memory (direct Rambus RAM, DR RAM).

It can be clearly understood by a person skilled in the art that, for the purpose of convenient and brief description, for detailed working processes and resulting technical effects of the foregoing apparatus and device, reference may be made to a corresponding processes and technical effects in the foregoing method embodiments, and details are not described herein again.

In the several embodiments provided in this application, the disclosed system, apparatus, and method may be implemented in other manners. For example, some features of the method embodiments described above may be omitted, or skipped. The apparatus embodiment described above is merely an example. The unit division is merely logical function division, and there may be another division manner in actual implementation. For example, a plurality of units or components may be combined or may be integrated into another system. In addition, coupling between units or components may be direct coupling or indirect coupling, and the coupling includes electrical connection, mechanical connection, or other forms of connections.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

In addition, the terms "system" and "network" are usually used interchangeably in this specification. The term "and/or" in this specification describes only an association relationship for describing associated objects and represents that three relationships may exist. For example, A and/or B may represent the following three cases: A alone, both A and B, and B alone. In addition, the character "I" in this specification usually indicates an "or" relationship between the associated objects.

To sum up, the foregoing descriptions are merely examples of embodiments of the technical solutions of this application, but are not intended to limit the protection scope of this application. Any modification, equivalent replacement, and improvement made without departing from the principle of this application shall fall within the protection scope of this application.

What is claimed is:

1. A method, comprising:
    displaying a first screen in a first shooting mode, wherein the first screen comprises a first control;
    detecting a first operation on the first control, wherein a first mapping in gamma processing corresponds to the first control and a second mapping in a single two-dimensional lookup table corresponds to the first control, and wherein in response to the first operation, the method further comprises:
        obtaining a third mapping in gamma processing and a fourth mapping in a three-dimensional lookup table, wherein the fourth mapping in the three-dimensional lookup table corresponds to the second mapping in a single two-dimensional lookup table;
        evenly dividing a first color space to obtain an image in an initial first color space and an image in an initial second color space;
        processing the image in the initial second color space based on the first mapping of the gamma processing, the third mapping of the gamma processing, and the fourth mapping in the three-dimensional lookup table, to obtain a third image, wherein the third image is an image in the initial second color space; and
        converting the third image to a fourth image in the first color space,
        wherein the second mapping in the two-dimensional lookup table is based on a pixel difference between the image in the initial first color space and the fourth image in the first color space;
    obtaining a to-be-processed image; and
    processing the to-be-processed image based on the first mapping and the second mapping to obtain a first image.

2. The method of claim 1, wherein processing the to-be-processed image based on the first mapping and the second mapping to obtain a first image comprises:
    processing the to-be-processed image based on the first mapping to obtain a second image, wherein a first adjustment amount and a second adjustment amount are based on the second image and the second mapping, and wherein the first adjustment amount indicates an adjustment amount of a first color component in the second image, and the second adjustment amount indicates an adjustment amount of a second color component in the second image; and obtaining the first image based on the second image, the first adjustment amount, and the second adjustment amount.

3. The method of claim 1, wherein when lightness is a first lightness value, the second mapping in the two-dimensional lookup table based on the pixel difference between the image in the initial first color space and the fourth image in the first color space.

4. The method of claim 1, wherein the first color space is an HSL color space or an HSV color space, and the initial second color space is an RGB color space.

5. The method of claim 1, wherein the first shooting mode is a shooting mode in which a frame output rate of images is greater than a preset threshold.

6. The method of claim 1, wherein the first control is a control for indicating the second mapping in the two-dimensional lookup table.

7. The method of claim 1, wherein the first control is a control for indicating automatic identification of the second mapping in the two-dimensional lookup table.

8. An electronic device, comprising:
a display; and
a processor coupled to the display, the processor configured to:
cause the display to display a first screen in a first shooting mode, where the first screen includes a first control;
detect a first operation on the first control, wherein a first mapping in gamma processing corresponds to the first control and a second mapping in a single two-dimensional lookup table corresponds to the first control, and wherein in response to the first operation, the processor is further configured to:
obtain a third mapping in gamma processing and a fourth mapping in a three-dimensional lookup table, wherein the fourth mapping in the three-dimensional lookup table corresponds to the second mapping in a single two-dimensional lookup table;
evenly divide a first color space to obtain an image in an initial first color space and an image in an initial second color space;
process the image in the initial second color space based on the first mapping of the gamma processing, the third mapping of the gamma processing, and the fourth mapping in the three-dimensional lookup table, to obtain a third image, wherein the third image is an image in the initial second color space; and
convert the third image to a fourth image in the first color space,
wherein the second mapping in the two-dimensional lookup table is based on a pixel difference between the image in the initial first color space and the fourth image in the first color space;
obtain a to-be-processed image; and
process the to-be-processed image based on the first mapping and the second mapping to obtain a first image.

9. The electronic device of claim 8, wherein when the processor processes the to-be-processed image based on the first mapping and the second mapping to obtain a first image, the processor is further configured to:
process the to-be-processed image based on the first mapping to obtain a second image, wherein a first adjustment amount and a second adjustment amount are based on the second image and the second mapping, and wherein the first adjustment amount indicates an adjustment amount of a first color component in the second image, and the second adjustment amount indicates an adjustment amount of a second color component in the second image; and obtain the first image based on the second image, the first adjustment amount, and the second adjustment amount.

10. The electronic device of claim 8, wherein when the processor determines the second mapping in the two-dimensional lookup table based on a pixel difference between the image in the initial first color space and the fourth image in the first color space, the processor is further configured to:
determine a first lightness value; and
determine, when lightness is the first lightness value, the second mapping in the two-dimensional lookup table based on the pixel difference between the image in the initial first color space and the fourth image in the first color space.

11. The electronic device of claim 8, wherein the first color space is an HSL color space or an HSV color space, and the initial second color space is an RGB color space.

12. The electronic device of claim 8, wherein the first shooting mode is a shooting mode in which a frame output rate of images is greater than a preset threshold.

13. The electronic device of claim 8, wherein the first control is a control for indicating the second mapping in the two-dimensional lookup table.

14. The electronic device of claim 8, wherein the first control is a control for indicating automatic identification of the second mapping in the two-dimensional lookup table.

15. A computer program product comprising computer-executable instructions stored on a non-transitory computer-readable medium that, when executed by a processor of an apparatus, causes the apparatus to:
display a first screen in a first shooting mode, wherein the first screen comprises a first control;
detect a first operation on the first control, wherein a first mapping in gamma processing corresponds to the first control and a second mapping in a single two-dimensional lookup table corresponds to the first control, and wherein in response to the first operation, the apparatus is further configured to:
obtain a third mapping in gamma processing and a fourth mapping in a three-dimensional lookup table, wherein the fourth mapping in the three-dimensional lookup table corresponds to the second mapping in a single two-dimensional lookup table;
evenly divide a first color space to obtain an image in an initial first color space and an image in an initial second color space;
process the image in the initial second color space based on the first mapping of the gamma processing, the third mapping of the gamma processing, and the fourth mapping in the three-dimensional lookup table, to obtain a third image, wherein the third image is an image in the initial second color space; and
convert the third image to a fourth image in the first color space,
wherein the second mapping in the two-dimensional lookup table is based on a pixel difference between the image in the initial first color space and the fourth image in the first color space;

obtain a to-be-processed image; and process the to-be-processed image based on the first mapping and the second mapping to obtain a first image.

16. The computer program product of claim 15, wherein when the apparatus processes the to-be-processed image based on the first mapping and the second mapping to obtain a first image, the apparatus is further configured to:

process the to-be-processed image based on the first mapping to obtain a second image, wherein a first adjustment amount and a second adjustment amount are based on the second image and the second mapping, and wherein the first adjustment amount is used to indicate an adjustment amount of a first color component in the second image, and the second adjustment amount is used to indicate an adjustment amount of a second color component in the second image; and obtain the first image based on the second image, the first adjustment amount, and the second adjustment amount.

17. The computer program product of claim 15, wherein the first color space is an HSL color space or an HSV color space, and the initial second color space is an RGB color space.

18. The computer program product of claim 15, wherein the first shooting mode is a shooting mode in which a frame output rate of images is greater than a preset threshold.

19. The computer program product of claim 15, wherein the first control is a control for indicating the second mapping in the two-dimensional lookup table.

20. The computer program product of claim 15, wherein the first control is a control for indicating automatic identification of the second mapping in the two-dimensional lookup table.

* * * * *